US008784710B2

(12) United States Patent
Hansen et al.

(10) Patent No.: US 8,784,710 B2
(45) Date of Patent: *Jul. 22, 2014

(54) EXPANDABLE POLYMER MEMBRANE AND TUBES, AND A METHOD OF MANUFACTURING THEREOF

(75) Inventors: Douglas R. Hansen, Belmont, NC (US); James V. Phillips, Rock Hill, SC (US)

(73) Assignee: Phillips Scientific Inc., Rock Hill, SC (US)

( * ) Notice: Subject to any disclaimer, the term of this patent is extended or adjusted under 35 U.S.C. 154(b) by 596 days.

This patent is subject to a terminal disclaimer.

(21) Appl. No.: 12/726,707

(22) Filed: Mar. 18, 2010

(65) Prior Publication Data

US 2011/0014459 A1    Jan. 20, 2011

Related U.S. Application Data

(60) Provisional application No. 61/226,251, filed on Jul. 16, 2009.

(51) Int. Cl.
| | |
|---|---|
| *B29C 47/88* | (2006.01) |
| *B29C 47/90* | (2006.01) |
| *B01D 67/00* | (2006.01) |
| *B29C 67/04* | (2006.01) |
| *B01D 53/22* | (2006.01) |
| *B29C 55/00* | (2006.01) |
| *B01D 71/36* | (2006.01) |
| *B29C 43/00* | (2006.01) |
| *B29C 55/14* | (2006.01) |
| *B29K 27/18* | (2006.01) |
| *B29C 43/22* | (2006.01) |
| *B29C 53/56* | (2006.01) |
| *B29L 31/00* | (2006.01) |
| *B29C 53/60* | (2006.01) |
| *B29K 105/04* | (2006.01) |
| *B29C 47/00* | (2006.01) |

(52) U.S. Cl.
CPC .......... *B29C 55/143* (2013.01); *B01D 67/0083* (2013.01); *B29K 2027/18* (2013.01); *B29C 43/22* (2013.01); *B29C 53/56* (2013.01); *B01D 67/0088* (2013.01); *B29L 2031/755* (2013.01); *B01D 67/002* (2013.01); *B29C 53/60* (2013.01); *B29K 2105/04* (2013.01); *B29C 47/0019* (2013.01); *B01D 67/0027* (2013.01); *B29C 67/04* (2013.01); *B29C 47/0004* (2013.01); *B01D 53/228* (2013.01); *B29C 55/005* (2013.01); *B01D 2323/42* (2013.01); *B01D 71/36* (2013.01); *B01D 67/0086* (2013.01); *B29C 47/0023* (2013.01); *B29C 43/006* (2013.01)
USPC ...... 264/211.13; 264/127; 264/175; 264/204; 264/210.3; 264/210.4; 264/210.5; 264/211.18; 264/211.2; 264/233; 264/234; 264/280; 264/320; 264/321; 427/243; 427/245

(58) Field of Classification Search
None
See application file for complete search history.

(56) References Cited

U.S. PATENT DOCUMENTS 3,274,323 A * 9/1966 Petriello .................. 264/308
4,049,589 A    9/1977 Sakane
(Continued)

OTHER PUBLICATIONS

Wikipedia, "Wikipedia, the free encyclopedia," Alcohol, Wikipedia. org, (p. 1-14), Nov. 2012.

*Primary Examiner* — Jeffrey Wollschlager
(74) *Attorney, Agent, or Firm* — Jeffrey C. Watson; Balser & Grell IP Law

(57) ABSTRACT

A method of making an expanded polytetrafluoroethylene (ePTFE) membrane including the steps of: providing an unsintered or partially sintered ePTFE membrane; matting the unsintered or partially sintered ePTFE membrane; and immediately thereafter, sintering the matted ePTFE membrane. A method for making ePTFE tubes includes the steps of: providing an unsintered or partially sintered ePTFE membrane; wrapping the ePTFE membrane around a mandrel or form tool to form an ePTFE tube; matting the ePTFE tube; immediately thereafter, sintering the matted ePTFE tube; and removing the sintered ePTFE tube from the mandrel or form tool.

11 Claims, 20 Drawing Sheets

(56) References Cited

U.S. PATENT DOCUMENTS

| | | | |
|---|---|---|---|
| 4,350,610 A | 9/1982 | Jung et al. | |
| 4,482,516 A * | 11/1984 | Bowman et al. | 264/127 |
| 4,985,296 A * | 1/1991 | Mortimer, Jr. | 428/220 |
| 5,041,225 A * | 8/1991 | Norman | 210/500.36 |
| 5,104,400 A * | 4/1992 | Berguer et al. | 264/132 |
| 5,374,473 A * | 12/1994 | Knox et al. | 428/218 |
| 5,800,512 A | 9/1998 | Lentz et al. | |
| 5,965,249 A | 10/1999 | Sutton et al. | |
| 5,993,593 A | 11/1999 | Swartz et al. | |
| 6,080,472 A * | 6/2000 | Huang et al. | 428/315.5 |
| 6,274,043 B1 * | 8/2001 | Newman et al. | 210/500.36 |
| 6,616,876 B1 * | 9/2003 | Labrecque et al. | 264/119 |
| 6,890,463 B2 | 5/2005 | Martakos et al. | |
| 6,921,606 B2 | 7/2005 | Sassa et al. | |
| 7,226,558 B2 * | 6/2007 | Nieman et al. | 264/291 |
| 7,416,761 B2 * | 8/2008 | Wang et al. | 427/245 |
| 7,442,352 B2 | 10/2008 | Lu et al. | |
| 7,553,543 B2 | 6/2009 | Bekiarian | |
| 7,922,946 B2 * | 4/2011 | Brandimarte et al. | 264/175 |
| 8,609,249 B2 * | 12/2013 | Hansen et al. | 428/421 |
| 2003/0062650 A1 * | 4/2003 | Martakos et al. | 264/209.3 |
| 2004/0084304 A1 | 5/2004 | Thompson | |
| 2004/0191893 A1 | 9/2004 | Newman et al. | |
| 2004/0232587 A1 * | 11/2004 | Martakos et al. | 264/209.3 |
| 2005/0074890 A1 | 4/2005 | Lemme et al. | |
| 2005/0244602 A1 * | 11/2005 | Oyama et al. | 428/35.7 |
| 2006/0177384 A1 | 8/2006 | Brown | |
| 2006/0233991 A1 * | 10/2006 | Humphrey et al. | 428/36.91 |
| 2007/0026515 A1 | 2/2007 | Newman et al. | |
| 2007/0072956 A1 | 3/2007 | Cody et al. | |
| 2009/0319034 A1 * | 12/2009 | Sowinski | 623/1.46 |
| 2010/0120106 A1 | 5/2010 | Kohn et al. | |

* cited by examiner

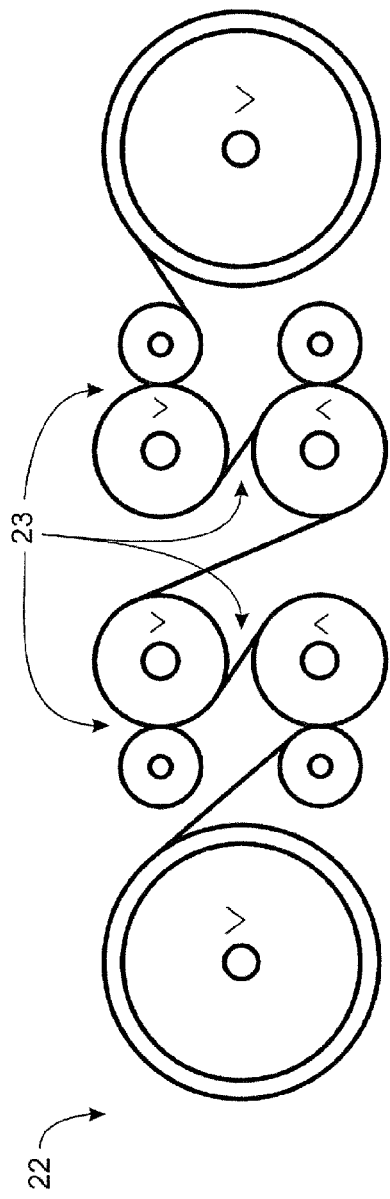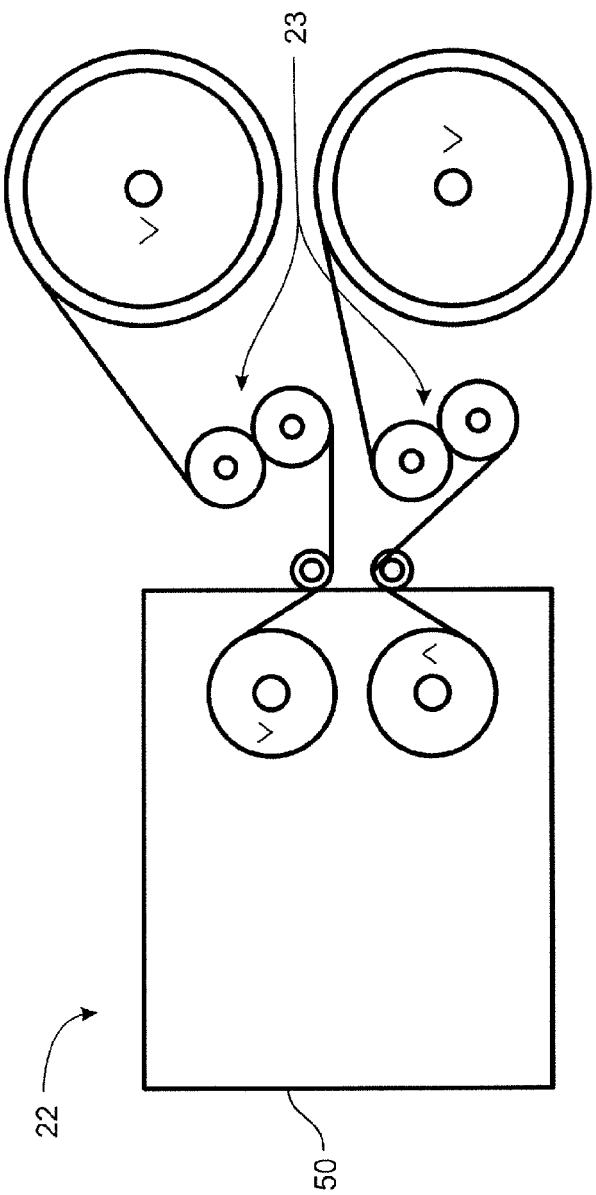
FIGURE 8A
FIGURE 8B

EXPANDABLE POLYMER MEMBRANE AND TUBES, AND A METHOD OF MANUFACTURING THEREOF

RELATED APPLICATION

This application claims the benefit of co-pending provisional application Ser. No. 61/226,251 filed Jul. 16, 2009.

FIELD OF THE INVENTION

The instant invention relates generally to expandable polymer membranes and tubes and methods for the manufacturing of such expandable polymer membranes and tubes, such as expanded polytetrafluoroethylene (ePTFE) membranes and tubes.

BACKGROUND OF THE INVENTION

An expandable polymer is any polymer capable of being expanded or stretched where it may become a porous membrane. One example of an expandable polymer is polytetrafluoroethylene (PTFE). PTFE is a fluorocarbon solid, as it is a high molecular weight compound consisting wholly of carbon and fluorine. It is an extremely versatile synthetic polymer due to its chemical inertness, wide temperature range, low friction coefficient and biocompatibility.

Expanded PTFE or ePTFE, discovered by W. L. Gore (U.S. Pat. No. 3,664,915), is PTFE that has been stretched to make it porous after being first extruded by a process called paste extrusion. Expanded PTFE has the inherent properties of PTFE, plus it is porous, and has higher strength than PTFE due to the fiber network formed during processing. ePTFE is usually available as a tape, film, or membrane type material.

ePTFE, due to its inertness, wide chemical compatibility and temperature range properties, may be ideal for many medical and industrial applications. Extremely thin and high strength variants of ePTFE are useful for some medical and industrial applications. In the case of endovascular devices, thinner wall, lower friction, higher strength membrane tubing may be desired due to the small diameter arteries that the devices must pass. Acoustic devices, including cell phone speakers and hearing aid device diaphragms, may require high strength flexible membranes and a venting function in order to relieve pressure buildup due to the thermal expansion of air in the device or barometric pressure changes. An industrial application such as a fuel cell MEA requires a high strength ePTFE membrane that has minimal creep and swelling. In the case of a gas or liquid filter that is laminated to a nonwoven or polymer film which is porous or perforated, it is useful to have an ePTFE membrane that has a slick low friction surface that also enables a high strength lamination bond to the nonwoven or polymer to which it is being laminated. The slick membrane surface minimizes filter cake buildup, while the high bond strength helps prevent failure of the laminate, which is reversed to release filter cake buildup. For certain medical device, filtration, chemical cell, or fuel cell applications it is useful to have an ePTFE membrane that bonds well to polymer films so as to provide a thermal melt sealable surface, or to provide a high integrity non porous gasketing surface on the perimeter of the membrane for improved sealing. In the case of solar cells or solar heating systems, UV water and air purification systems an ePTFE membrane with increased light transmittance at wider incidence angles may improve efficiency or performance. For lighting devices, a light diffuser that has a high transmittance, is breathable, and can sustain higher temperatures than other polymers may be desirable. Thus, there is a need to create an ePTFE with unique properties for both medical and industrial applications.

A conventional method of forming an article made of an expandable polymer, such as ePTFE, is to blend a powdered resin with a wettable liquid, such as a lubricant or extrusion aid, and compress the combination into a preformed mold, typically of a cylindrical shape. The wettable liquid may be mixed with the powdered resin to control the degree of material shear that occurs during subsequent extrusion and to prevent excessive shear, which can damage the material. Using a ram-type extruder, the mold may then be extruded through a die having a desired cross-section. The extruded material may be calendered or compressed after extruding to reduce the cross section. Next, the wettable liquid is removed from the extruded material by evaporating the wettable liquid through drying or any another extraction method. The dried extruded material may then be stretched in one or more directions at an elevated temperature below the crystalline melting point of the resin. Finally, the stretched material is typically sintered, or heated to a temperature ranging from just below to significantly above its melting point, depending on the time at the elevated temperature, in order to lock in the physical state of the material.

U.S. Pat. No. 6,890,463 is directed to a method involving rewetting of expandable polymers with a liquid to allow for subsequent enhanced expansion. The wetting liquid includes a drug and/or an agent, such that the resulting polymer contains and emits the drug upon positioning. This method is said to provide the material with unique properties. However, the method teaches that a stretching step be performed after the application of the wetting liquid. Thus, this method is limited to applying the wettable liquid before the expansion step.

However, the addition of a wetting liquid, with or without the inclusion of a drug or active agent, to mat down or densify the material, right after expansion and without any subsequent expansion, prior to high temperature sintering, may be advantageous in providing a material with unique properties. The instant invention is designed to address this issue.

SUMMARY OF THE INVENTION

The instant invention includes a method for making expanded polytetrafluoroethylene (ePTFE) membranes. The method may include the steps of: providing an unsintered or partially sintered ePTFE membrane; matting the unsintered or partially sintered ePTFE membrane; and immediately thereafter, sintering the matted ePTFE membrane.

The instant invention also includes a method for making ePTFE tubes. The method may include the steps of: providing an unsintered or partially sintered ePTFE membrane; wrapping the membrane around a mandrel or foam tool to form an ePTFE tube; matting the ePTFE tube; immediately thereafter, sintering the matted ePTFE tube; and removing the sintered ePTFE tube from the mandrel or form tool.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

FIG. 8 are schematic drawings of two embodiments of stretching the tape in the machine direction according to the instant invention.

DETAILED DESCRIPTION OF THE DRAWINGS

Figure 1:
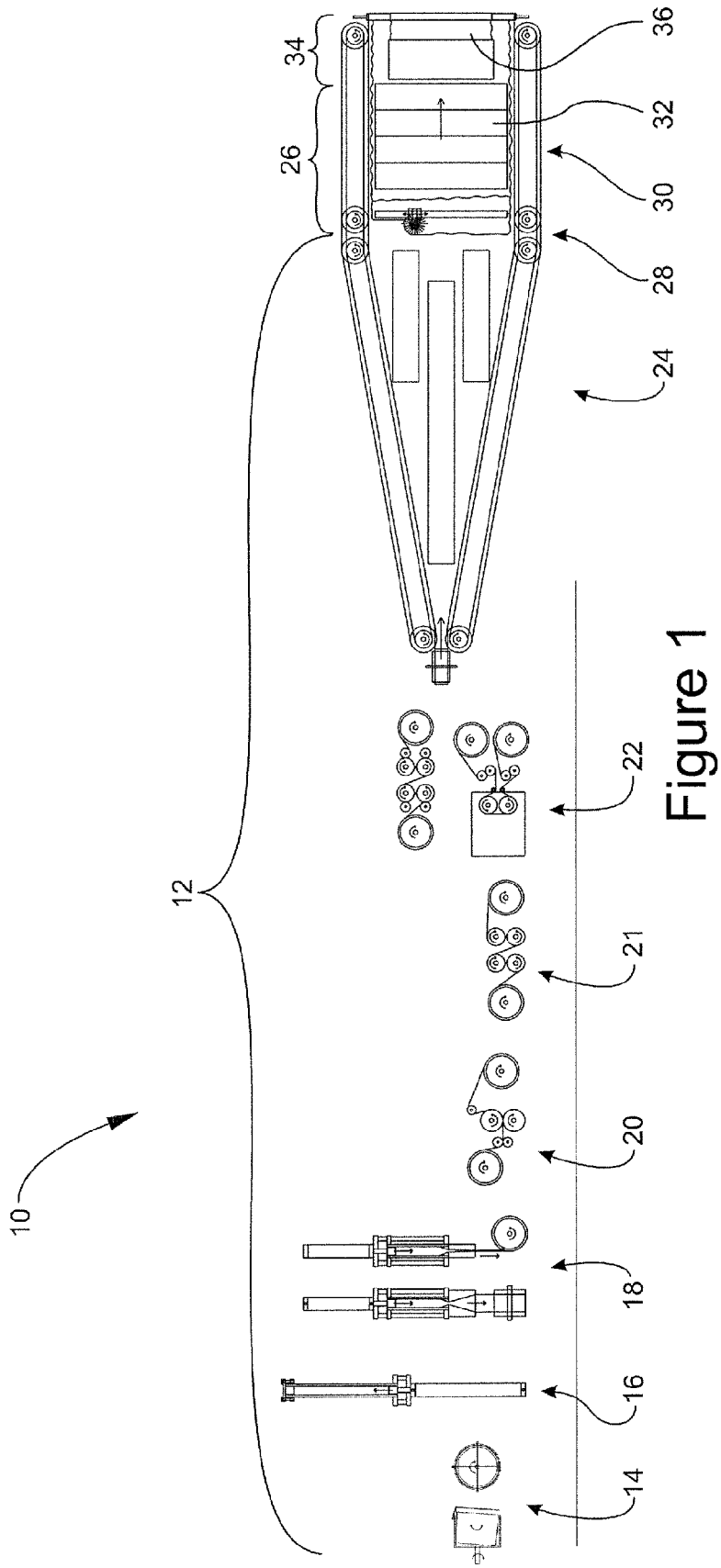
FIG. 1 is a schematic drawing of one embodiment of the method of making an ePTFE according to the instant invention.
Figure 2:
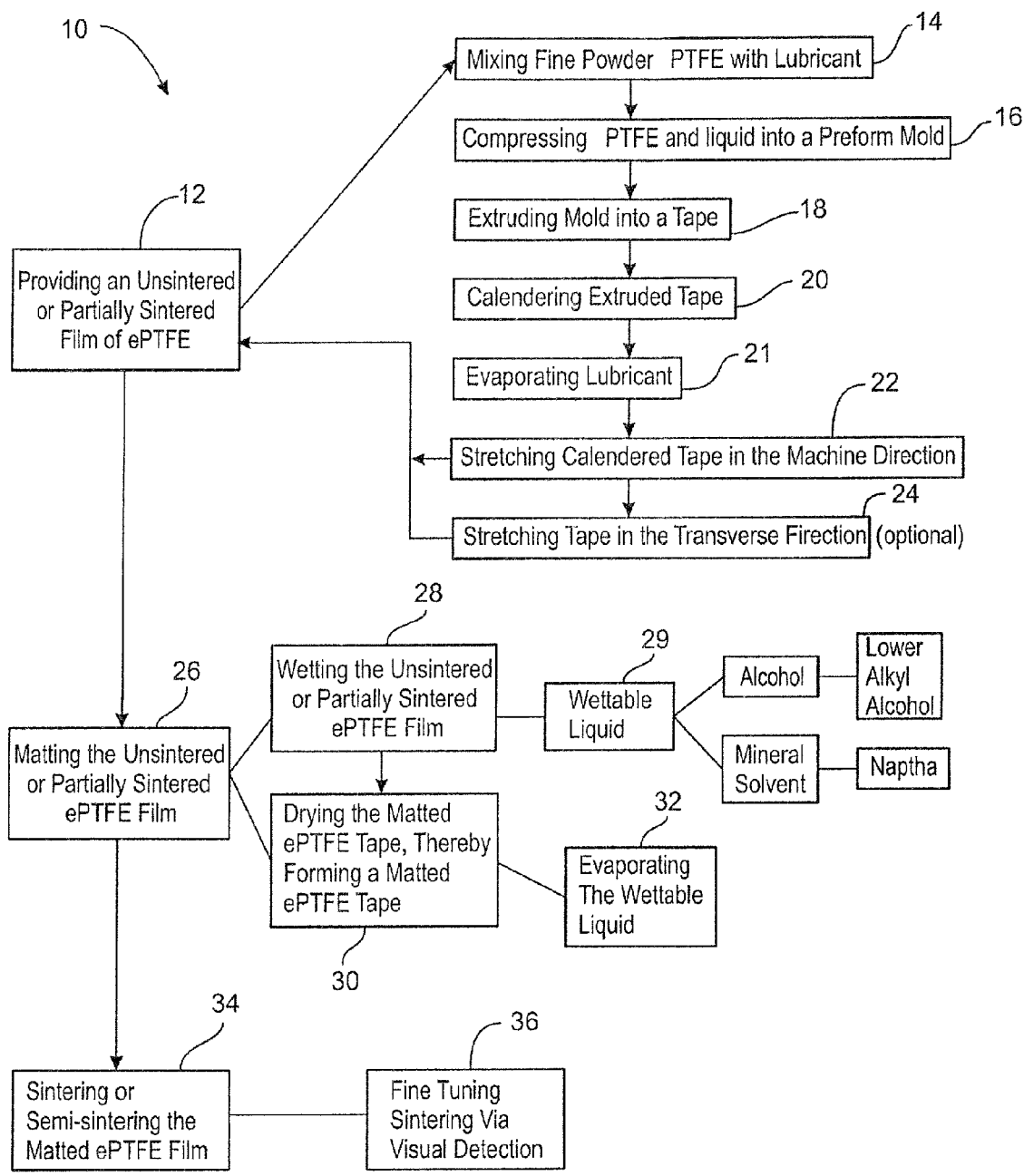
FIG. 2 is a flow diagram of one embodiment of the method of making an ePTFE membrane according to the instant invention.

Referring to the drawings, wherein like numerals indicate like elements, there is shown in FIGS. 1 and 2 an embodiment of a method 10 for manufacturing expanded polytetrafluoroethylene, also known as ePTFE. Although the instant invention is directed to a method of making ePTFE, the invention is not so limited. The instant invention may also be utilized in making any expandable polymer, including, but not limited to, PET (polyethylene terephthalate), and UHMWPE (ultra high molecular weight polyethylene). Method 10 for making ePTFE may generally include, but is not limited to, the following steps: a step 12 of providing an unsintered or partially sintered, ePTFE membrane; a step 26 of matting the unsintered or partially sintered, stretched PTFE membrane; and a step 34 of sintering the matted PTFE membrane.

Step 12 of providing an unsintered or partially sintered ePTFE membrane 13 may be included in method 10. See FIGS. 1-9. Step 12 may include providing membrane 13 by any means known in the art. Unsintered or partially sintered ePTFE membrane 13 may be any PTFE, ePTFE membrane or other expandable polymer membrane. In one embodiment, step 12 of providing an unsintered or partially sintered ePTFE membrane may include, but is not limited to, the following steps: a step 14 of mixing a powder PTFE resin 42 (typically a fine powder) with a lubricant 38 creating a mix 15; a step 16 of compressing mix 15 into a preform mold 17; a step 18 of extruding the preform mold 17 into a tape 19; a step 20 of calendering the extruded tape 19; a step 21 of evaporating the lubricant 38 from the extruded tape 17; a step 24 of stretching the calendered tape 17 in the machine direction; and a step 24 of stretching the calendered tape 17 in the transverse direction. These steps may provide an unsintered or partially sintered ePTFE membrane 15 and are further described below.

Figure 3:
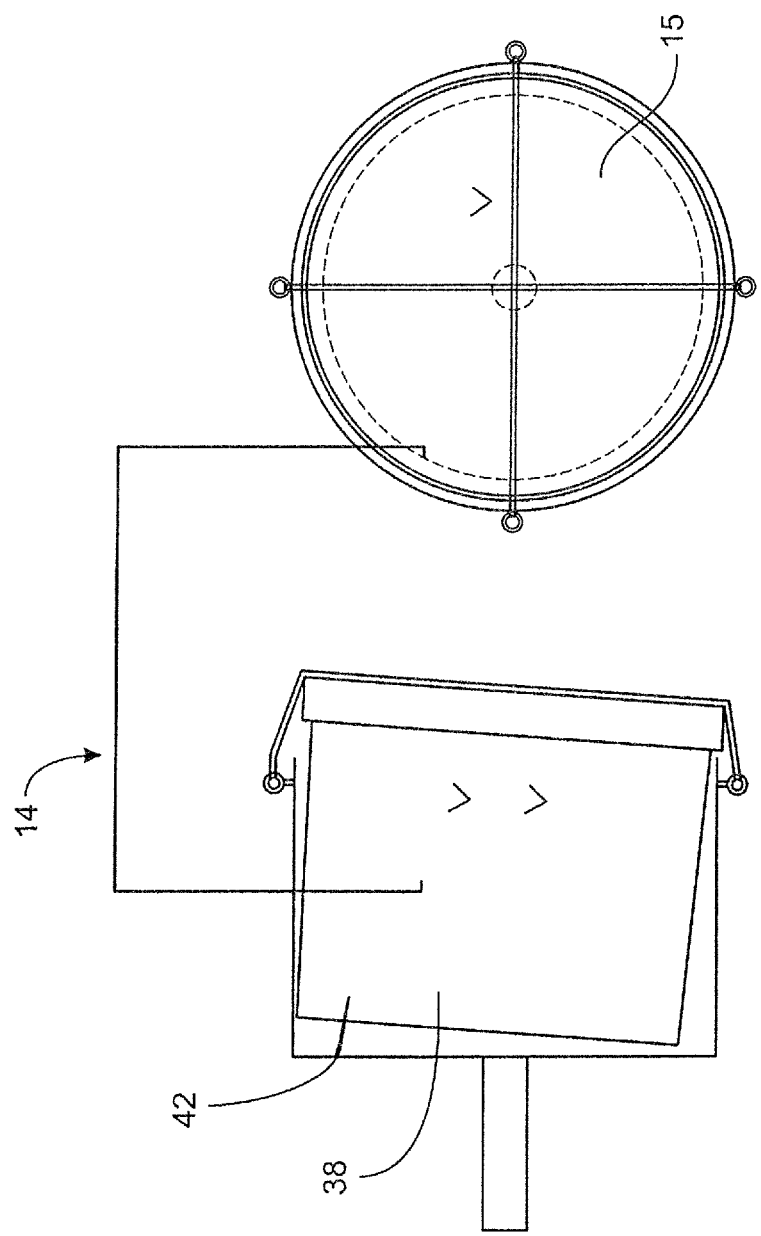
FIG. 3 is a schematic drawing of one embodiment of the step of mixing a fine powder PTFE resin with a lubricant according to the instant invention.
Figure 4:
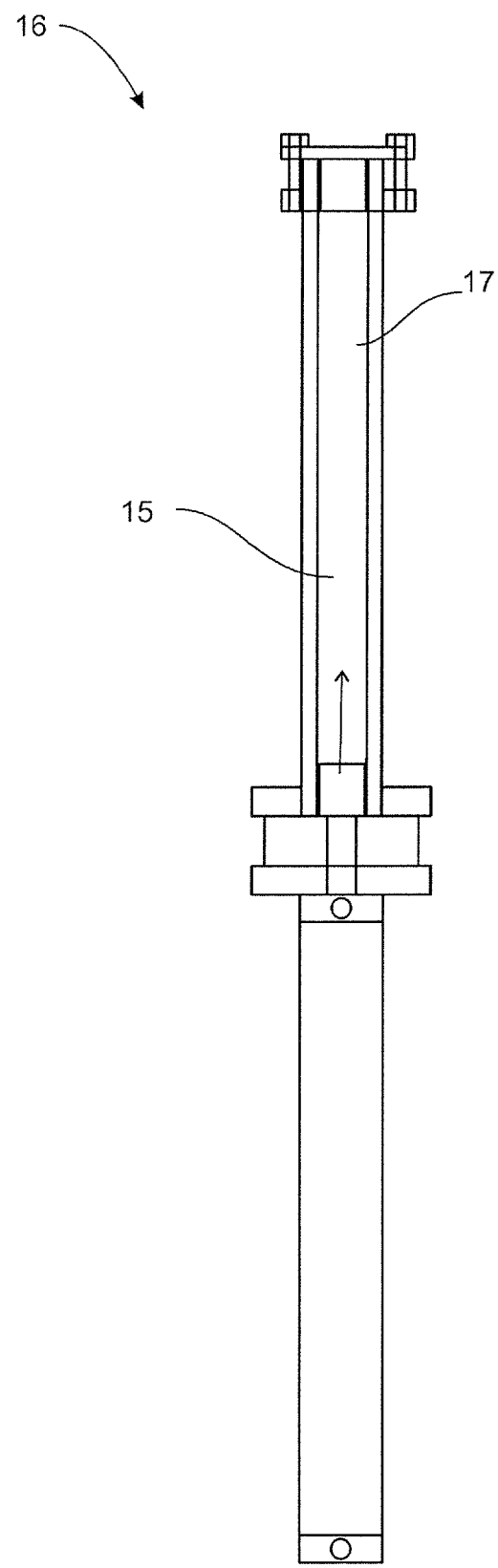
FIG. 4 is a schematic drawing of one embodiment of the step of compressing the mix into a preform mold according to the instant invention.
Figure 5:
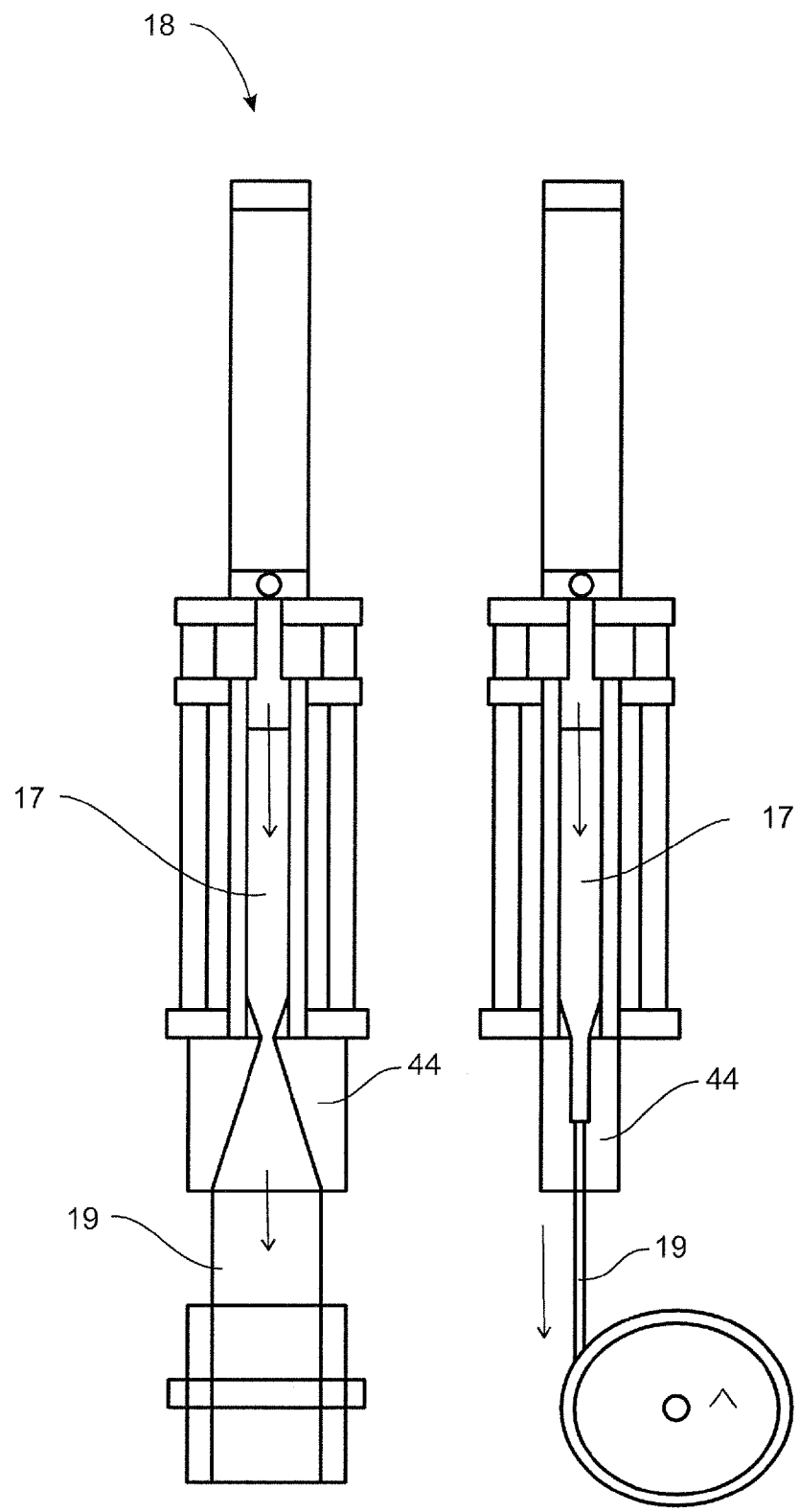
FIG. 5 is a schematic drawing of one embodiment of the step of extruding the molded mix into a tape according to the instant invention.
Figure 6:
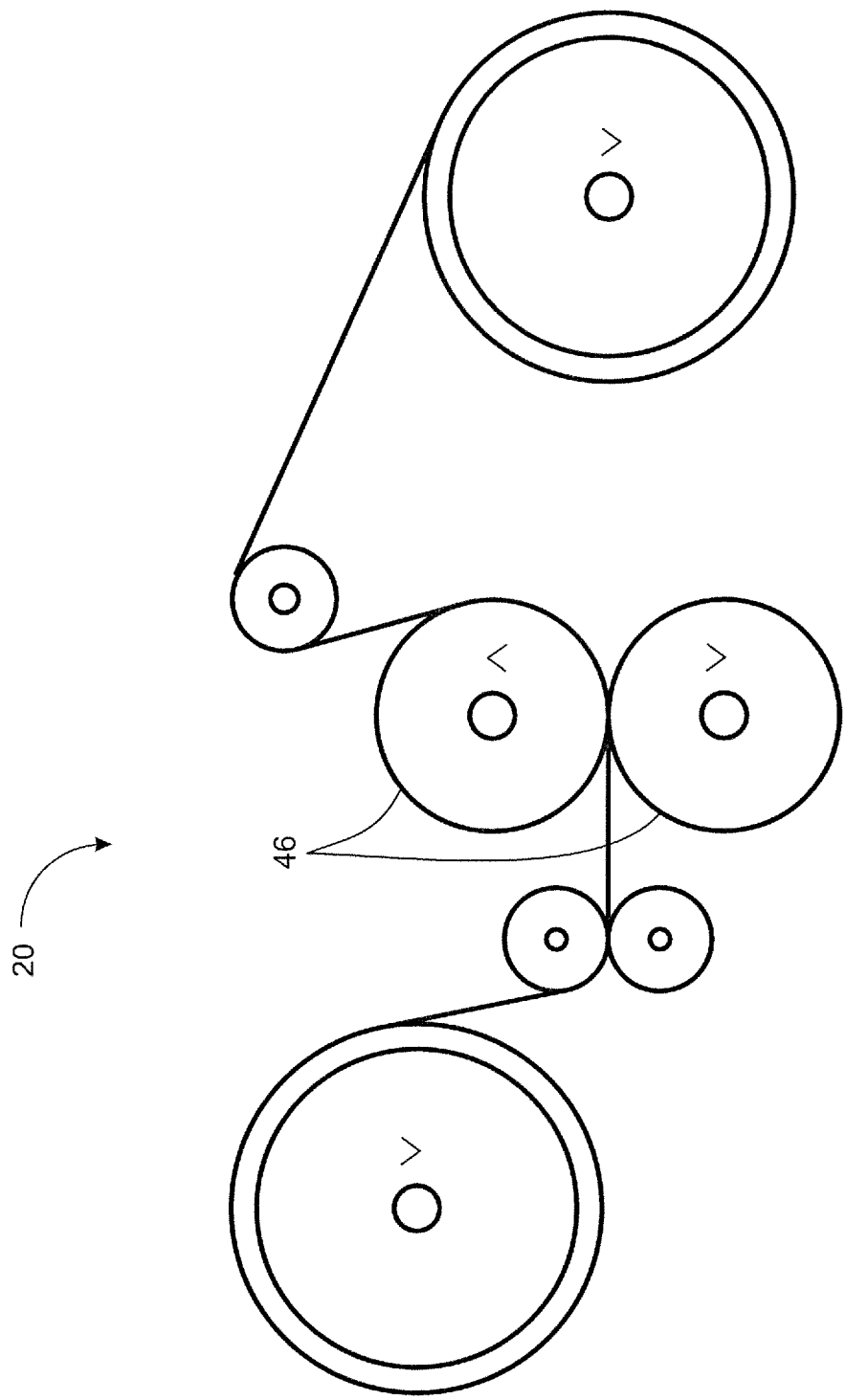
FIG. 6 is a schematic drawing of one embodiment of the step of calendering the extruded tape according to the instant invention.
Figure 7:
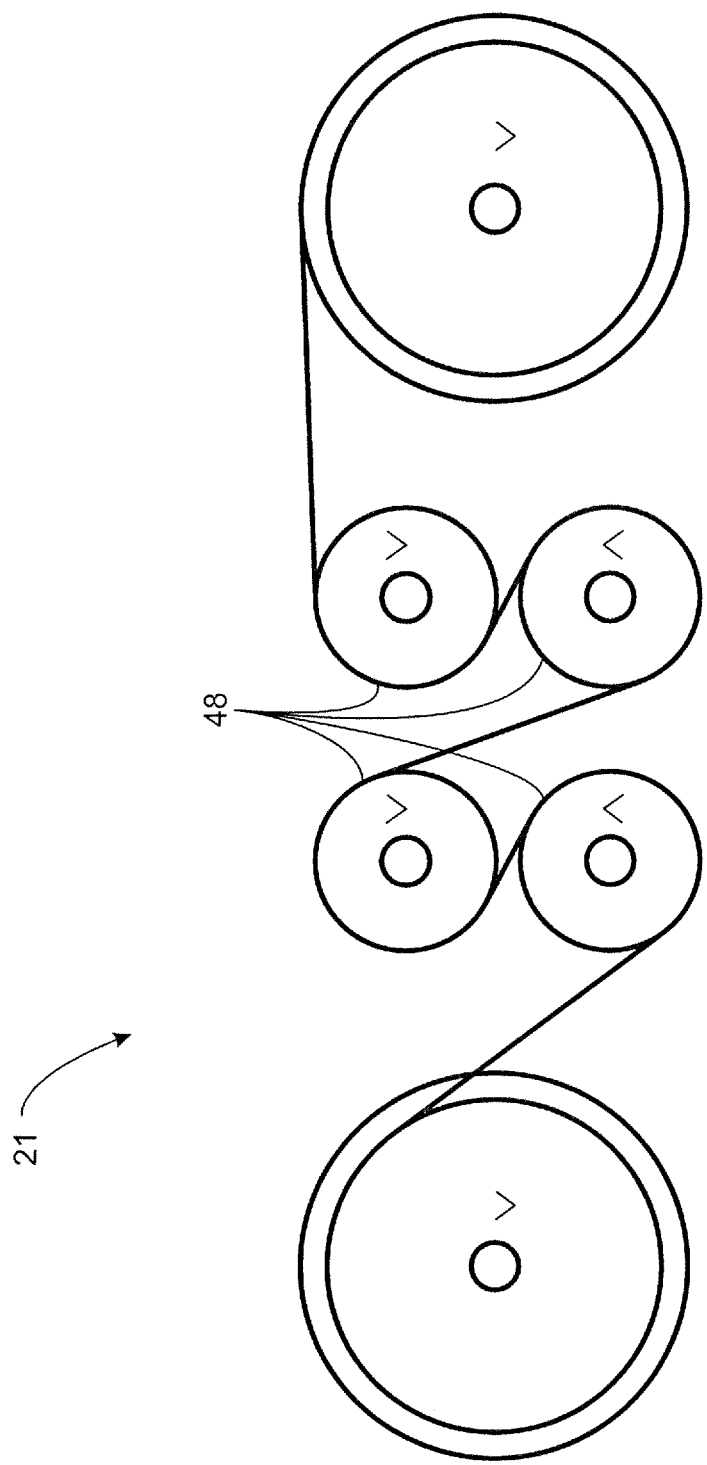
FIG. 7 is a schematic drawing of one embodiment of evaporating the lubricant according to the instant invention.

The first step of providing an unsintered or partially sintered ePTFE membrane may be a step 14 of mixing a powder polytetrafluoroethylene resin 42 with a lubricant 38 creating a mix 15. See FIG. 3. Step 14 may be to control the degree of material shear that occurs during subsequent extrusion and to prevent excessive shear, which can damage the material. Step 14 may include any steps for mixing resin 42 with lubricant 38 to create mix 15. In one embodiment, step 14 may include pouring resin 42 and lubricant 38 into an eccentrically rotating mixing barrel to mix the two ingredients. The left view of FIG. 3 shows the barrel positioned eccentrically in a cut-away view of the mixer. The right view of FIG. 3 is an end view showing the barrel mounted in the mixer. The mixing may be manual or automated. For example, a high molecular weight fine powder PTFE resin, such as Dupont® 601A, Daikin® F131, Solvay Solexis® XP132 may be mixed with a mineral solvent such as Isopar C, K, H, or M, VM&P Naptha or Mineral spirits. The ingredients may be mixed in the proportion of between 80 to 120 grams of solvent to one pound of PTFE fine Powder Resin.

The next step after mixing the PTFE resin and lubricant may be a step 16 of compressing mix 15 into a preform mold 17. See FIG. 4. Step 16 may be for compressing the air out of mix 15 and for providing mix 15 in a specific form or mold for extrusion. Step 16 may include any steps for compressing mix 15 into preform mold 17. In one embodiment, step 16 may include pouring mix 15 into a tube and slowly compressing the mix with an air, hydraulic, or electrical actuated ram.

The next step after compressing the mix into a preform mold may be a step 18 of extruding preform mold 17 into tape 19. See FIG. 5. Step 18 may be for making mold 17 into the form of tape 19. Step 18 may include any steps for making mix 15 take the form of tape 19. Step 18 may include any extruding steps known in the art. In one embodiment, step 18 may include forcing extruding mold 17 from a slot die 44 through a paste-type extruder to obtain tape 19.

The next step after extruding the tape may be an optional step 20 of calendering the extruded tape 17. See FIG. 6. Step 20 may be for compressing tape 17 to a certain thickness and to impart strength to the extruded tape. Step 20 may include any calendering steps known in the art. In one embodiment, step 20 of calendaring extruded tape 17 may include passing tape 17 through a single pair of calender rolls 46. In another embodiment, step 20 may include passing tape 17 through any number of calender rolls 46.

The next step after calendering the tape may be a step 21 of evaporating the lubricant 38 from the extruded tape 17. See FIG. 7. Step 21 may be for removing the lubricant from the tape. Step 21 may include any steps for removing the lubricant from the tape. In one embodiment, step 21 may include passing tape 21 through one or a plurality of heated rolls 48. In another embodiment, step 21 may include passing tape 21 over a curved heated plate or through an oven. Basically, step 21 requires the extruded tape 17 to be heated to a temperature high enough to evaporate the lubricant.

The next step after evaporating the lubricant from the extruded tape may be a step 22 of stretching the calendered tape 17 in the machine direction (MD). See FIG. 8. Step 22 may be for stretching tape 17 in the machine direction to orient the fibers in the machine direction. The stretching may reduce the thickness of the tape to create a more membrane like material. Step 22 may include any steps for stretching tape 17 in the machine direction. The total MD stretch provided in step 22 may be anywhere from 1:1 up to 100:1 In one embodiment, the total MD stretch of step 22 may be from 4:1 to 50:1. In one embodiment, step 22 may include passing tape 17 through a plurality of heated nip rolls 23. See FIG. 8A. Heated nip rolls 23 may be set to any temperature, including, but not limited to 300° F. In another embodiment, step 22 may include passing tape 17 through a high temperature stretch oven 50 during stretching. See FIG. 8B. High temperature stretch oven 50 may be set to any temperature, including, but not limited to 600° F. In another embodiment, step 22 may include passing tape 17 through a plurality of heated nip rolls 23 and high temperature convection oven 50. Infrared heaters may also be used to heat the tape while performing MD stretching. Step 22 may be carried out by stretching the tape in the MD direction one time, or in several passes.

Figure 9:
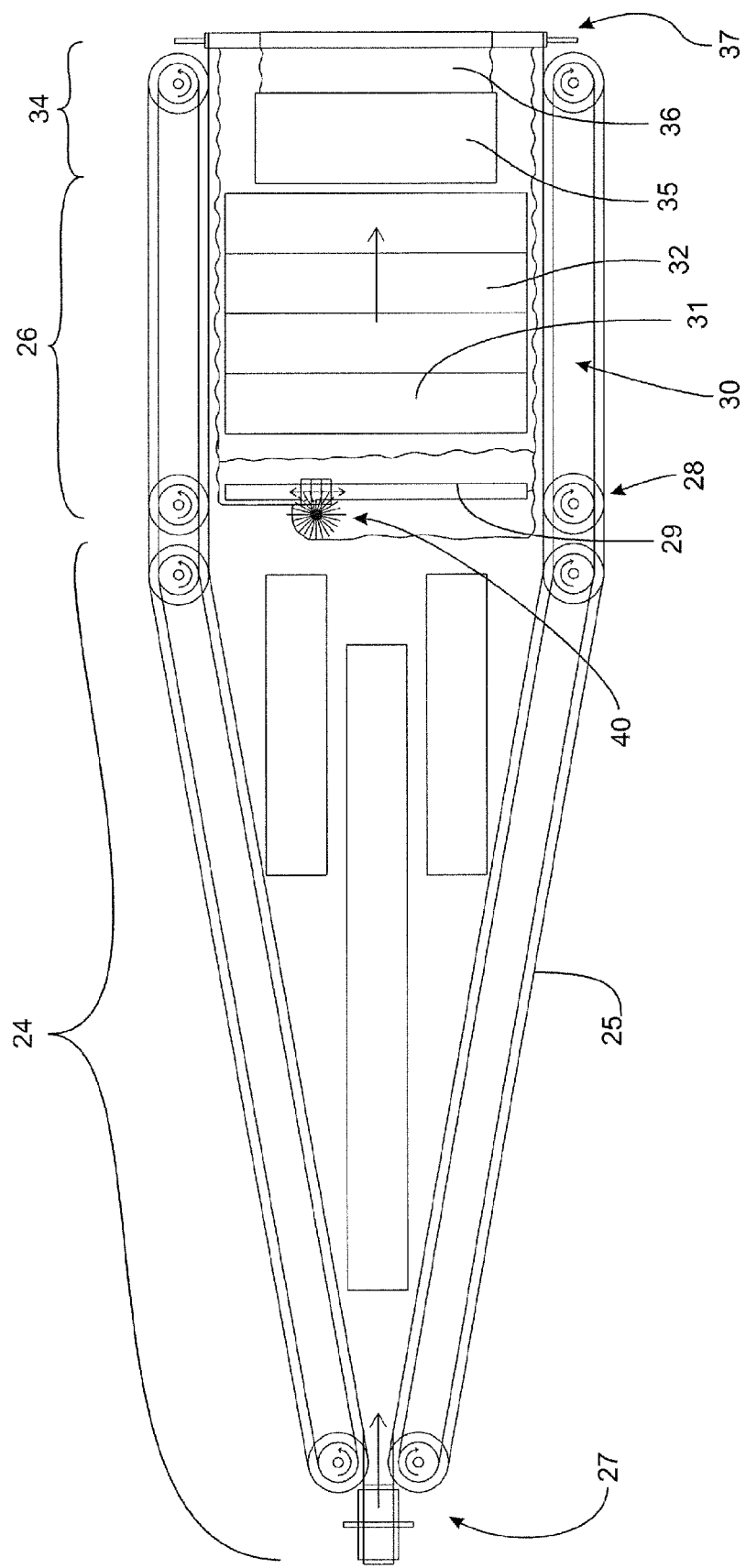
FIG. 9 is a schematic drawing of one embodiment of the steps of stretching the tape in the transverse direction, matting the unsintered or partially sintered, ePTFE tape, and sintering the ePTFE membrane, according to the instant invention.

The next step after machine direction stretching may be an optional step 24 of stretching tape 17 in the transverse direction (TD), or cross-machine direction. See FIG. 9. Step 24 may be for stretching tape 17 in the transverse direction to orient the fibers in the transverse direction. This stretching may also reduce the thickness to create a more membrane or film like material. The total TD stretch provided in step 24 may be anywhere from 1:1 up to 100:1 Step 24 may include any steps for stretching tape 17 in the transverse direction. In one embodiment, step 24 may include passing tape 17 along a tenter frame 25. Tenter frame 25 may be a 25 foot tenter frame. Infrared heaters may also be used to heat the tape while performing TD stretching. As shown in FIG. 9, a pay-off spool 27 may be positioned at the beginning of the tenter frame 25. Step 24 may be carried out by stretching the tape in the TD direction one time, or in several passes.

In one embodiment, the MD and TD stretching, steps 22 and 24, respectively, may be done simultaneously. This simultaneous MD and TD stretching may be done on a tenter frame, or any other device that provides for simultaneous TD and MD stretching.

The result of the aforementioned steps of mixing, extruding, calendering, stretching (both MD and TD) may form and provide an unsintered, stretched PTFE membrane. These steps may be used in forming an ePTFE membrane or tube. An additional step of partially sintering the PTFE membrane may be included. This partial sintering may make the membrane easier to work with. The following details are the remaining steps in forming the ePTFE membrane or tube. These steps may be utilized for creating unique properties of the ePTFE membrane or tube.

Figure 10:
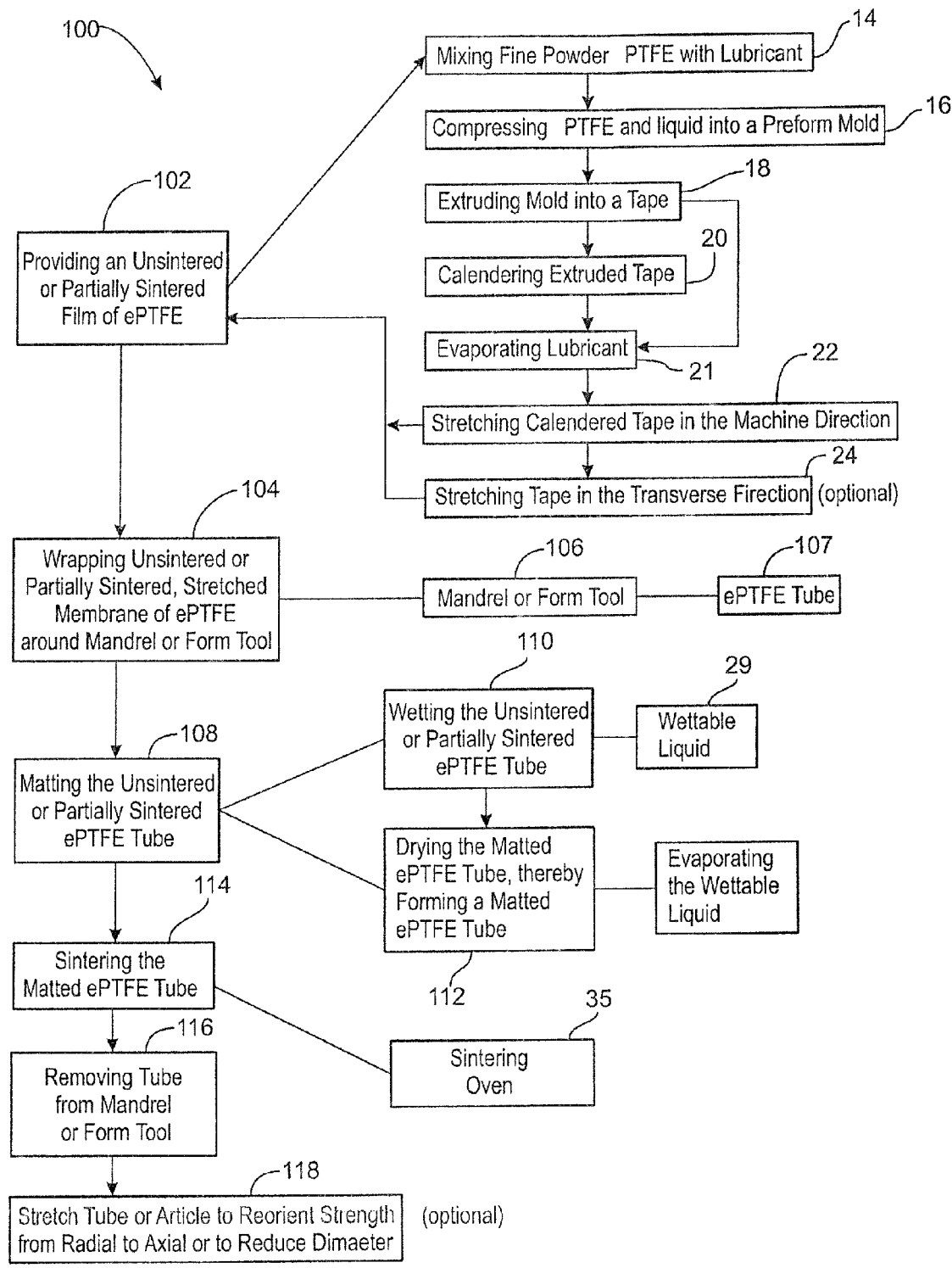
FIG. 10 is a flow diagram of one embodiment of the method of making an ePTFE tube according to the instant invention.

The first step of making the ePTFE membrane or film (membrane is called film in FIGS. 2 and 10), after the unsintered or partially sintered ePTFE membrane is provided, may be a step 26 of matting the unsintered or partially sintered ePTFE membrane. See FIG. 9. Step 26 may be for matting down the membrane or densifying the membrane. Step 26 may include any steps for matting down the membrane or densifying the membrane. Step 26 may mat the membrane down and therefore reduce the thickness of the membrane. In one embodiment, step 26 may mat the membrane down and reduce the thickness between 25-90%. In another embodiment, step 26 may mat the membrane down and reduce the thickness between 40% and 80%. In another embodiment, step 26 may mat the membrane down and reduce the thickness between 60% and 75%. In one embodiment, step 26 may include: a step 28 of wetting the unsintered or partially sintered ePTFE membrane with a wettable liquid 29; and a step 30 of drying the wetted PTFE membrane.

Step 28 of wetting the unsintered or partially sintered ePTFE membrane with a wettable liquid 29 may be included in step 26 of matting the unsintered or partially sintered ePTFE membrane. See FIG. 9. Step 28 may be to add wettable liquid 29 to mat down the membrane or densify it. Wettable liquid 29 may be any liquid, including, but not limited to, an alcohol and a mineral solvent. The alcohol may be any alcohol, including, but not limited to, a lower alkyl alcohol, like a methanol, an ethanol, a propanol, and a butanol. The alcohol may be mixed with water or a solvent. The mineral solvent may be any mineral solvent including any napthas. In one embodiment of step 28 of wetting the PTFE membrane, wettable liquid 29 may be sprayed on the PTFE membrane with a sprayer 40 moving back and forth across the membrane. In another embodiment, wettable liquid 29 may be sprayed on the PTFE membrane by a plurality of sprayers 40. The wettable liquid 29 may also be sprayed or poured on the membrane while being fed over a roll and then spread and lightly wiped with a rigid or flexible doctor blade or soft roller to mat the wet membrane. Ideally, wettable liquid 29 may be applied when the membrane is stretched close to its full width and length prior to sintering. Otherwise, the matted membrane may become unmatted and the desired densified result will not be realized.

Step 30 of drying the wetted PTFE membrane may remove wettable liquid 29 to form a matted PTFE membrane. See FIG. 9. Step 30 may include any steps for drying or removing wettable liquid 29 from the PTFE membrane. Step 30 may be done while restraining the membrane to prevent it from coming un-matted. This may include utilizing a tenter frame to pull the membrane out slightly but not enough to un-mat the matted membrane. In one embodiment of step 30, the PTFE membrane may be heated under a preheat heater 30. Preheat heater 30 may be for removing wettable liquid 29 before sintering. Wettable liquid 29 may be removed via evaporation under preheat heater 30. Preheat heater 30 must be set to a temperature high enough to evaporate wettable liquid 29 before sintering, but not too hot where wettable liquid 29 becomes volatile or where sintering of the material occurs (sintering typically occurs above 650° F. for ePFTE membranes). In one embodiment, preheat heater 30 may be set to a temperature of between 400° F. and 600° F. In another embodiment, preheat heater 30 may be set to a temperature of 550° F.

Although, the instant invention is directed toward matting via wetting the membrane with a wettable liquid, various other methods of matting the membrane may be used. These methods may include, but are not limited to, the following examples. The first example of other processes for matting the membrane may be to mat the membrane by passing the ePTFE membrane between nip rollers. In this example, one roll may have a smooth chrome surface, the other roll may have a 40 durometer silicone surface, the rolls may be pressed together with an air cylinder, the smooth roll may be driven by a gear motor, and the silicone roller may be mounted on bearings. Using this method, a 2 mil membrane may be matted or compressed to between 0.5 and 1 mil thickness. The surface however may not be uniform due to the difficulty of feeding unsintered membrane into the nip rolls. Another example of matting the ePTFE membrane may be by lightly compressing it between a smooth flat or curved surface and a low durometer foam rubber with tight weave liner. In this process, a roller may be used to apply pressure over the foam rubber pad. With this process, a 2.5 mil membrane may be matted or compressed to 1 mil and may be similar to the IPA matted surface in uniformity except for a texture pattern embossed from the liner on the surface. However, since the matting was done on a flat glass plate the process of matting using this method could not be performed in a continuous manner. Another example of matting the ePTFE membrane may be lightly compressing it between a glass plate and a smooth metal foil. In this example, a rolling pin may be used to apply pressure over the foil. With this process, the resulting densified membrane surface of a 2.5 mil thick membrane may be compressed from 2.5 mil to 1 mil and may not be as uniform as the matted membrane made using the foam rubber pad (described above). Yet another example of matting the ePTFE membrane may be matting the membrane by tamping of the surface with a soft nonwoven. With this process, a 2.5 mil membrane may be matted or compressed from 2.5 mil to approximately 1 mil. The resulting surface may have a blotchy appearance. Yet another example of matting the ePTFE membrane may be matting the membrane by tamping of the surface with a soft brush. In this process, the membrane may be stretched over a flat glass plate. With this process, the membrane thickness of a 2.5 mil membrane may be reduced from 2.5 mil to approximately 1 mil. The resulting surface may have a scratched appearance. A final example of matting the ePTFE membrane may be matting the membrane by applying a low to high pressure stream of water. In this process, the membrane may be stretched over a flat glass plate.

However, none of the above attempts resulted in the same level of smooth uniform matted surface that is achieved by the method of this invention, that of matting with a fluid that soaks into and lightly packs the membrane fibers.

The next step after matting the ePTFE membrane may be a step 34 of sintering (or semi-sintering) the matted ePTFE membrane. Step 34 may be for heating the ePTFE membrane to a temperature with a time duration sufficient to partially or completely sinter the ePTFE membrane. Step 34 may be immediately after step 26 of matting the unsintered or partially sintered ePTFE membrane. Thus, method 10 may be without any stretching between step 26 of matting the ePTFE membrane and step 34 of sintering (or semi-sintering) the matted polytetrafluoroethylene membrane. Step 34 may include any sintering or semi-sintering techniques known in the art. Step 34 may be accomplished by sintering the membrane under an IR heater, over a heated roller, or in a batch or converyorized convection oven. In one embodiment, step 34 may include heating the PTFE membrane in a high temperature sintering oven 35 to a sintering or semi-sintering temperature. In one embodiment of sintering oven 35, the sintering temperature may be between 600° F. and 1100° F. In another embodiment, the sintering temperature may be between 750° F. and 935° F. The sintering temperature may be above 680° F. The use of the higher temperatures allows faster processing rates, plus it can be used to purposely degrade the most outer layer of the surface which enlarges surface cavities. This over sintering and surface degrading is referred to as Hyper-Sintering™ by Phillips Scientific, Inc. of South Carolina, and can be useful for medical applications where a coarser surface texture may be desired, or in filtration applications to increase fluid flow across the membrane, or in application where the coarse surface improves bonding to other films or nonwoven materials. Step 34 may include any steps for sintering the ePTFE membrane. In one embodiment, step 34 may include a step 36 of fine tuning sintering via visual detection.

Figure 19:
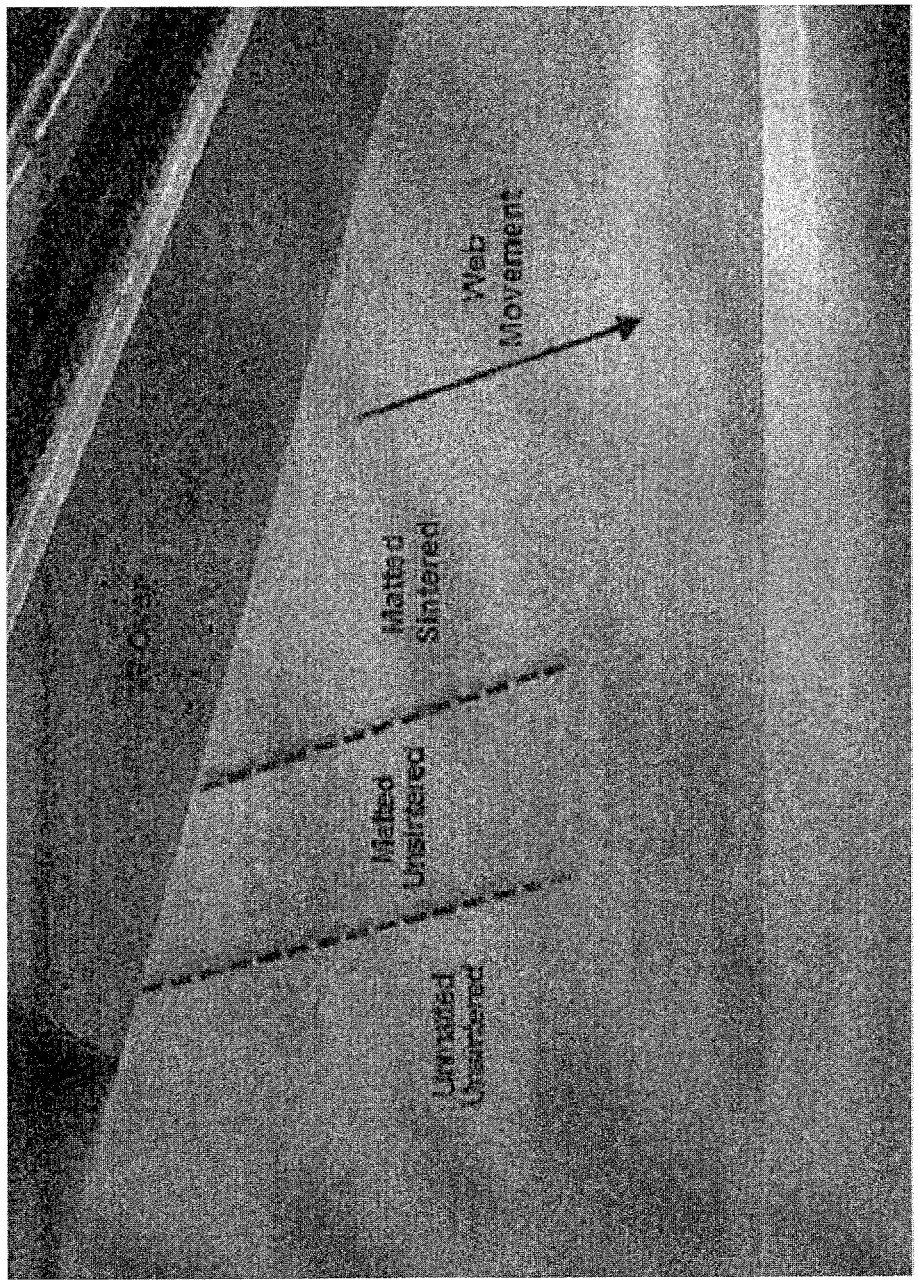
FIG. 19 is a photograph of an ePTFE membrane made according to the instant invention showing the location of different off white color hues for the step of fine tuning sintering via visual detection.
Figure 20:
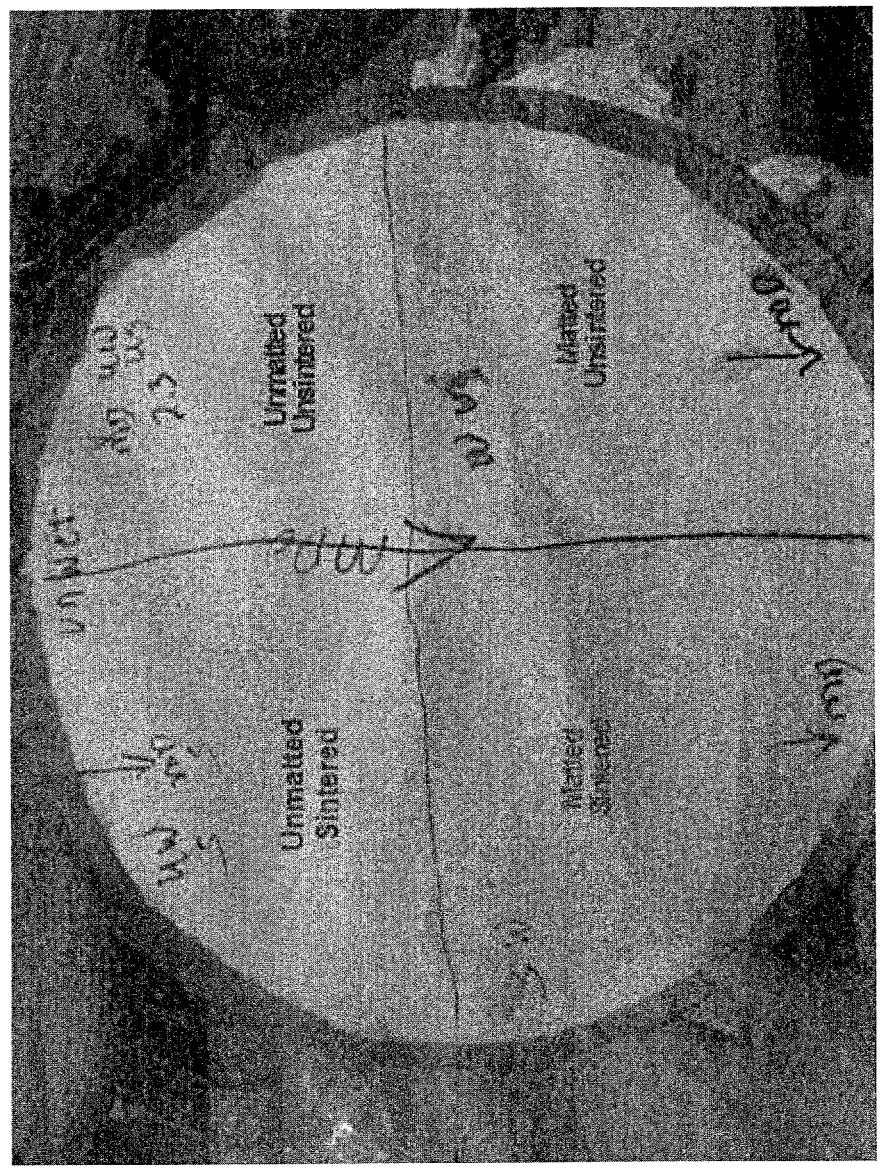
FIG. 20 is another photograph of an ePTFE membrane made according to the instant invention showing the different off white color hues for the step of fine tuning sintering via visual detection.

Step 36 of fine tuning sintering via visual detection may be performed by examining the ePTFE membrane after sintering and determining the opaqueness of the membrane. See FIGS. 19-20. FIG. 19 shows an ePTFE membrane as it exits sintering oven 35 at the end of production. FIG. 20 shows an ePTFE membrane draped over a bowl where the ePTFE membrane was sintered and/or matted manually. Each of these photographs show the effects of matting and/or sintering on the opaqueness or hues of the ePTFE membrane. As a result, one advantage of matting step 26 may be the ability to readily detect whether the ePTFE membrane becomes sintered by visual means. There are three distinct bands of off white that result, where each band differs by its opaqueness. On each edge of the membrane a lighter white opaque band is seen which indicates unsintered and unmatted ePTFE membrane. The next band from the edge is slightly darker (less opaque) in hue and indicates membrane that has been matted but is unsintered. The final band which fowls the center section of the sintered membrane is even darker (less opaque) off white hue and indicates that the membrane is matted and sintered. If the power to high temperature sintering oven 35 were turned down, one would notice that the center band of the membrane exiting from under the heater would become narrower. This visual feedback provides a good method for fine tuning the sintering temperature required to adequately sinter the membrane without degrading the membrane by over sintering. The measured temperature at the location just under the membrane being sintered may be between 900° F. and 1000° F. which is much higher than the temperature required to sinter, thus, the visual feedback by examination of the distinct bands is important. In other words, the opaqueness of the membrane can determine whether or not the membrane has been sintered properly. Thus, if the membrane is less opaque than desired, the temperature may be raised. Conversely, if the membrane is more opaque than desired, the temperature may be lowered.

The above process 10 may be for making an ePTFE membrane or film. The film may be taken up on a take-up spool 37, as shown in FIG. 9. The following process 100 may be for making an ePTFE tube. See FIG. 10. The ePTFE tube may provide a tube with unique properties including, but not limited to, low friction, high strength, ultra thin wall, minimal or no seam line visibility, and good bonding properties to other polymers and nonwovens. The resulting ePTFE tube may be particularly useful for such applications, including, but not limited to, medical and industrial applications.

The first step of method 100 of manufacturing an ePTFE tube, similar to method 10, may be a step 102 of providing an unsintered or partially sintered ePTFE membrane. See FIG. 10. Step 102 may be exactly the same as step 12 of method 10 described above. This includes, the steps of mixing, extruding, calendering, stretching (both MD and/or TD) to form and provide a unsintered or partially sintered ePTFE membrane. The following details the remaining steps in forming the ePTFE tube. These steps may create the unique properties of the ePTFE tube.

The first step of method 100 of making the ePTFE tube, after the unsintered or partially sintered ePTFE membrane is provided, may be a step 104 of wrapping the unsintered or partially sintered ePTFE membrane around a mandrel or form tool 106 to form a tube 107. See FIG. 10. Step 104 may be for creating tube 107 out of the membrane. Step 104 may include wrapping the membrane around mandrel or form tool 106 any number of times to form tube 107. The number of times the membrane is wrapped around mandrel or form tool 106, the tension, and the thickness of the membrane may determine the thickness of tube 107. For example, a 0.1 mil thick membrane may be wrapped around mandrel or form tool 106 80 to 200 times to create a 10 mil thick tube 107, depending on the tension. Mandrel or form tool 106 may be any known mandrel or form tool known in the art for wrapping membranes to create a tube like structure. The mandrel or form tool may be a metal, glass, fluoropolymer, or ceramic mandrel or form tool. Step 104 may include any steps for wrapping the PTFE membrane around the mandrel, including, but not limited to: chucking the mandrel between centers; paying off the membrane over the mandrel; cutting the edge of the membrane and adhere by brushing or pressing the edge to the mandrel; rolling up a length of the membrane to build up the wall of the tube to its desired thickness; cutting the end of the membrane; and brushing or pressing the edge of the membrane on the previous layer.

Tube 107 created by step 104 of wrapping the unsintered or partially sintered ePTFE membrane around a mandrel or form tool 106 to form a tube 107 may include any size or shape tube. As should be understood by one skilled in the art, the size and shape of tube 107 may be determined by the size and shape of mandrel or form tool 106.

Prior to step 104, the ePTFE membrane may be provided in an unsintered state or a slightly sintered state. Having the membrane unsintered or slightly sintered may allow for improved wrapping of the membrane around mandrel or form tool 106 by allowing the layers to slightly smear into one another to improve the fiber contact between layers. The slight mismatch that occurs between layers also may improve the transverse of axial strength of the resulting sintered tube. The relative tackiness of the unsintered or semisintered membrane also provides a better adhesion between layers when the tube or profile is sintered. This may be due to the slight entanglement of fibers at the contact surface between layers that provide a mechanical attachment when the fibers are sintered and become more rigid.

The next step of method 100 of making the ePTFE tube, after the membrane is wrapped to form tube 107, may be a step 108 of matting the ePTFE tube. See FIG. 10. Step 108 may be for matting down the tube or densifying the tube. Step 108 may include any steps for matting down the tube or densifying the tube. Step 108 may mat the tube down and therefore reduce the thickness of the tube prior to sintering. In one embodiment, step 108 may mat the tube down and reduce the thickness between 25-90%. In another embodiment, step 108 may mat the tube down and reduce the thickness between 40% and 80%. In another embodiment, step 108 may mat the tube down and reduce the thickness between 60% and 75%. In one embodiment, step 108 may include: a step 110 of wetting the wrapped ePTFE tube with wettable liquid 29; and a step 112 of drying the wetted ePTFE tube. An optional step of applying pressure to the tube may also be included to help mat it down.

Step 110 of wetting the wrapped ePTFE tube with wettable liquid 29 may be included in step 108 of matting the wrapped ePTFE tube. See FIG. 10. Step 110 may be to add wettable liquid 29 to mat down the tube or densify it. As discussed before, wettable liquid 29 may be any liquid, including, but not limited to, an alcohol or a mineral solvent. The alcohol may be any alcohol, including, a lower alkyl alcohol. The mineral solvent may be any mineral solvent including any napthas. Step 110 of wetting the wrapped ePTFE tube with wettable liquid 29 may include wetting by any means, including, but not limited to, spraying, dipping, or brushing wettable liquid 29 onto the tube. This wetting process my be applied to the whole tube or just portions of the tube and may be done manually or may be automated. Wettable liquid 29 may be applied prior to sintering or the matted tube will become unmatted and the desired densified result will not be realized. If a fluid that wets the ePTFE tube, such as IPA, is soaked into a single layer or multiple layers of a wrapped tube, the resulting material when sintered may have a substantially higher density and strength, based on cross sectional area. The wetting fluid (for example, IPA) aids in minimizing the appearance of the seam formed by the outer layer of membrane. The matted membrane end sticks better to the previous wrapped layer forming a better sintered bond to the previous layer. Matting of layers may provide good surface contact to allow better fiber to fiber contact and prevent the edge from lifting up during the later steps of sintering.

Step 112 of drying the wetted ePTFE tube may remove wettable liquid 29 to form a matted ePTFE tube. See FIG. 10. Step 112 may include any steps for drying or removing wettable liquid 29 from the ePTFE tube. In one embodiment of step 112, the ePTFE tube may be dried by the application of a heater or by placing the tube into an oven. The heater or oven may be for evaporating wettable liquid 29 before sintering.

The next step of method 100 after matting the ePTFE tube may be a step 114 of sintering the matted ePTFE tube. Step 114 may be for heating the ePTFE tube to a temperature just before its melting point to lock in its physical properties. Step 114 may be immediately after step 108 of matting the wrapped ePTFE tube. Thus, method 100 may be without any stretching between step 108 of matting the ePTFE tube and step 114 of sintering the matted ePTFE tube. Step 114 may be accomplished by sintering the membrane under an IR heater, or in a batch or converyorized convection oven. In one embodiment, step 114 may include heating the ePTFE tube in a high temperature sintering oven 35 to a sintering temperature. In one embodiment, the sintering temperature may be between 600° F. and 1100° F. In another embodiment, the sintering temperature may be between 750° F. and 935° F. The sintering temperature may be above 680° F. Typical sintering temperatures are between 680° F. and 740° F. As with the membrane, the use of the higher temperatures allows faster processing rates, plus it can be used to purposely degrade the most outer layer of the surface which enlarges surface cavities. This over sintering and surface degrading is referred to as hyper-sintering and can be useful for medical applications where a coarser surface texture may be desired, or in filtration applications to increase fluid flow across the membrane, or in application where the coarse surface improves bonding to other films or nonwoven materials. Step 114 may include any steps for sintering the ePTFE tube.

The next step of method 100 after sintering the ePTFE tube may be a step 116 of removing the sintered ePTFE tube from mandrel or form tool 107. Step 116 may include any steps for removing the tube from mandrel or form tool 107.

An optional step of method 100 may be a step 118 of stretching tube 107 after sintering. Step 118 may be for reorienting the strength of tube 107 from radial to axial. Step 118 may also be for reducing the diameter of tube 107. Step 118 may include any steps for stretching tube 107. The stretching may be by pulling on the ends of tube 107 to stretch the tube axially. This may render the ePTFE tube more uniform. This axial stretching may reorient the tubing fibers so that the strength in the radial direction is reduced while the axial strength is increased. Additional sintering of the reoriented tube will lock in the reorientation to a certain degree. This stretching step 118 may also be used to form profiled tubes with tapers or multiple diameters along the length of the tube. If a lower radial to axial strength is desired, the ePTFE tube can be reoriented by semisintering the tube on a mandrel bye heating in a batch oven at a temperature above 600° F., removing the tube from the mandrel, then stretching the tube over a profile or smaller size mandrel and then sintering the axially stretched tube in an oven to a temperature above 680° F. for a long enough duration to sinter the tube.

The ePTFE membrane made according to the instant invention may also include other improved properties over a similar non matted ePTFE membrane. These improved properties include: improved tensile strength in both the MD and TD directions, slicker surface or reduced coefficient of friction, improved lamination bond to other polymer films, and reduced equivalent pore sizes, as measured by its bubble point. Accordingly, the instant ePTFE membrane or tube, as shown in the tables below, may be distinguished from prior non-matted membranes or tubes in at least six ways: 1) a substantially thinner membrane, 2) a substantially lower coefficient of friction, 3) a substantially stronger membrane in both the MD and TD directions, 4) a substantially larger bubble point, 5) an increased lamination peel strength, and 6) increased light transmittance. In the Tables below, ePTFE membranes made according to the instant invention (with matting) with various initial unmatted and unsintered thicknesses (0.5 mils, 2.5 mils and 4 mils) are compared to ePTFE membranes made according to the prior art (without matting) with the same various thicknesses (0.5 mils, 2.5 mils and 4 mils). The criteria are set forth in the Tables below.

An ePTFE membrane may be made according the above described process. The ePTFE membrane may be different from the prior art ePTFE membranes because of the matting step. In Table 1 below, the effect of matting and sintering of ePTFE membranes on the thickness of the membrane is shown. As can be seen from the table, the instant invention of matting the ePTFE membrane clearly reduces the thickness of the membrane. In one embodiment, the sintered ePTFE membrane is reduced by at least 20% when compared to the thickness of a similar unmatted ePTFE membrane. In another embodiment, the sintered ePTFE membrane is reduced by at least 40% when compared to the thickness of a similar unmatted ePTFE membrane.

TABLE 1

Effect of Matting & Sintering on ePTFE Membrane Thickness (mils)

| Initial Thickness of ePTFE Membrane (unmatted and unsintered) | Sintered ePTFE Membrane (unmatted) | Matted ePTFE Membrane (unsintered) | Matted and Sintered ePTFE Membrane |
| --- | --- | --- | --- |
| 0.6 | 0.3 | 0.2 | 0.18 |
| 2.5 | 1.7 | 0.6 | 0.45 |
| 4 | 3 | 1.4 | 0.9 |

Another unique property of this matted ePTFE membrane may be that it has a coefficient of friction that is lower than a similar ePTFE membrane made without matting. See Table 2 below. The coefficient of friction was measured by a method similar to that described by ASTM D1894-08 except that the specified number of samples was not tested, the sled material surface was not replaced each time a sample was processed, and an ePTFE thread was used instead of a nylon filament. The ePTFE membrane surface being measured was taped to a flat plane and was measured with respect to a nonwoven wipe available from E.I. Dupont (P/N 8801, Sontara Wiper, 55% Cellulose, 45% Polyester, thickness approximately 0.010"). In one embodiment, the matted ePTFE membrane may have a coefficient of friction of less than 0.40. In another embodiment, the matted ePTFE membrane may have a coefficient of friction of less than 0.35.

TABLE 2

Effect of Matting on ePTFE Membrane Coefficient of Friction

| Initial Thickness of ePTFE Membrane (unmatted and unsintered) | Sintered ePTFE Membrane (unmatted) | Matted and Sintered ePTFE Membrane |
| --- | --- | --- |
| 0.6 mils | 0.47 | 0.3 |
| 2.5 mils | 0.44 | 0.32 |
| 4 mils | 0.59 | 0.32 |

Another unique property of this matted ePTFE membrane may be that it has a tensile strength in both the MD and ID directions that is greater than a similar ePTFF, membrane made without matting. See Table 3 below. In one embodiment of the ePTFE membrane made according to the instant invention, the tensile strength in the machine direction may be improved by at least 200% when compared to the MD tensile strength of a similar unmatted ePTFE membrane. The tensile strength being defined as maximum load to break divided by cross sectional area. In another embodiment of the ePTFE membrane made according to the instant invention, the tensile strength in the transverse direction may be improved by at least 200% when compared to the TD tensile strength of a similar unmatted ePTFE membrane.

TABLE 3

Effect of Matting & Sintering on ePTFE Membrane Tensile Strength (ksi)

| Initial Thickness of ePTFE Membrane (unmatted and unsintered) | Initial ePTFE Membrane (Unmatted and Unsintered) | | | Sintered ePTFE Membrane (unmatted) | | | Matted ePTFE Membrane (unsintered) | | | Matted and Sintered ePTFE Membrane | | |
|---|---|---|---|---|---|---|---|---|---|---|---|---|
| | MD | TD | MD/TD | MD | TD | MD/TD | MD | TD | MD/TD | MD | TD | MD/TD |
| 2.5 mil | 0.9 | 0.5 | 1.8 | 2.0 | 1.3 | 1.5 | 4.0 | 2.1 | 1.9 | 8.4 | 6.3 | 1.3 |
| 4.0 mil | 1.0 | 0.6 | 1.7 | 1.1 | 0.8 | 1.4 | 3.7 | 1.7 | 2.2 | 4.2 | 3.2 | 1.3 |

Another unique property of this matted ePTFE membrane may be that it has a bubble point that is greater than a similar ePTFE membrane made without matting. See Table 4 below. An increased bubble point correlates to a reduced equivalent pore size. In one embodiment of the ePTFE membrane made according to the instant invention, the bubble point of the membrane may be increased (equivalent pore size is reduced) by at least 7% when compared to the bubble point of a similar unmatted ePTFE membrane. In another embodiment of the ePTFE membrane made according to the instant invention, the bubble point of the membrane may be increased (equivalent pore size is reduced) by at least 25% when compared to the bubble point of a similar unmatted ePTFE membrane.

and a seal of approximately 0.1" width was made. The peel test was performed using an Imada Test Stand with a Extech Model 475040 force gauge attached to the moving section. A 2" wide section of the bonded ePTFE-LDPE was pulled apart by clamping the LDPE to the base, attaching the ePTFE material to a clamp connected to the force gauge, then raising the ePTFE section at a rate of approximately 8 inches per minute while measuring the maximum force to break the bond. In one embodiment made according to the instant invention the bonding force was increased by over 40% as compared to a lamination of a similar unmatted ePTFE membrane bonded to LDPE.

TABLE 4

Effect of Matting and Sintering on ePTFE Membrane Bubble Point (psi)

| Initial Thickness of ePTFE Membrane (unmatted and unsintered) | Initial ePTFE Membrane (unmatted and unsintered) | Matted ePTFE Membrane (unsintered) | Sintered ePTFE Membrane (unmatted) | Matted and Sintered ePTFE Membrane |
|---|---|---|---|---|
| 0.6 mils | 10.5 | 10 | 7 | 7.5 |
| 2.4 mils | 23.5 | 24 | 10 | 19 |
| 4 mils | 27 | 26 | 15 | 19 |

The ePTFE surface resulting from the instant invention also provides a better bonding surface. See Table 5 below. The bond strength, or peel strength, of an ePTFE membrane laminated to a Low Density Polyethylene (LDPE) film backing of a Polyester film was tested. The bond was made by thermal

TABLE 5

Effect of Matting on ePTFE Membrane Lamination Peel Strength (gms)

| Initial Thickness of ePTFE Membrane (unmatted and unsintered) | Initial ePTFE Membrane (unmatted and unsintered) | Matted ePTFE Membrane (unsintered) | Sintered ePTFE Membrane (unmatted) | Matted and Sintered ePTFE Membrane |
|---|---|---|---|---|
| 2.4 mils | 148 | 239 | 618 | 872 | bonding the LDPE, to the ePTFE membrane using an impulse sealer manufactured by American International Electric Inc., Model #AIE-450FL. The sealing timer was set to number 8

The ePTFE membrane resulting from the instant invention also provides increased light transmittance. See Table 6 below. The increased transmittance makes the membrane suitable for use as a high efficiency, lightweight, high temperature, UV resistant, self venting light diffuser.

At a viewing perspective perpendicular (90 degrees) to the membrane surface, with the membrane mounted in a frame with no back lighting, in a fluorescent lit room, the matted & sintered ePTFE membrane had a Munsell Color of White with an Munsell Value of V-(N8.75). The unmatted/unsintered, unmatted/sintered, and matted unsintered ePTFE membrane had Munsell Values similar to the Centroid (N/). The apparent lower Munsell value for the matted & sintered ePTFE membrane is due to its very high transmittance.

Table 6 shows the transmittance of the ePTFE membrane of the instant invention relative to other ePTFE membrane forms produced from the same unsintered and unmatted ePTFE membrane. The Light Transmittance Percentage equals Light Intensity coming out of the sample divided by the Light Intensity of the Incident Light×100. The Foot Candle Light Meter is an Extech model 401027. Samples from the four quadrants of the ePTFE membrane of FIG. 20 were positioned flat and directly over the top of the Light Sensor. The results of the test show that the matted ePTFE membranes have a significantly greater transmittance as compared to unmatted ePTFE membranes made from the same initial unsintered ePTFE membrane. In one embodiment made according to the instant invention the incandescent light transmittance was increased by over 29% as compared to the transmittance of a similar unmatted ePTFE membrane. The fluorescent light transmittance for the same embodiment made according to the instant invention was increased by over 80% as compared to the transmittance of a similar unmatted ePTFE membrane.

When viewing from overhead, it was also noticed that the membranes that were both matted & sintered had a darker hue (or lower Munsell color value) when viewed at a much wider range of incidence angles with respect to the reflected light source location than other membranes that were not both matted and sintered. This would indicate that the matted and sintered ePTFE membranes have a higher transmittance over a wider range of incidence angles. In such applications as a membrane layer or tube in a solar panel, LCD lens or diffuser, LED lens or diffuser, or UV air or water purification device, high transmittance over a wide range of incidence angles may be a useful efficiency or performance enhancing property.

without being degraded. Since ePTFE is also highly UV resistant it can be used in visible, UV or IR lighting located outdoors or in equipment used to purify air or water. The wide pH compatibility range of ePTFE may make it useful in lighting device applications where corrosive chemicals are present. Likewise, due the inertness and biocompatibility of the ePTFE membrane of the instant invention, it may be useful in medical device applications where high transmittance may be advantageous.

As previously discussed, the significantly higher transmittance of the matted and sintered ePTFE membrane can be used to aid in fine tuning the temperature of the sintering heater as the membrane exits the tenter frame. The effect of small increases to the heater temperature shows up as a wider band of darker appearing sintered membrane with a distinct transition from matted & unsintered to matted & sintered membrane. There is also a distinct transition in color from unmatted & unsintered to matted & unsintered membrane.

Figure 15:
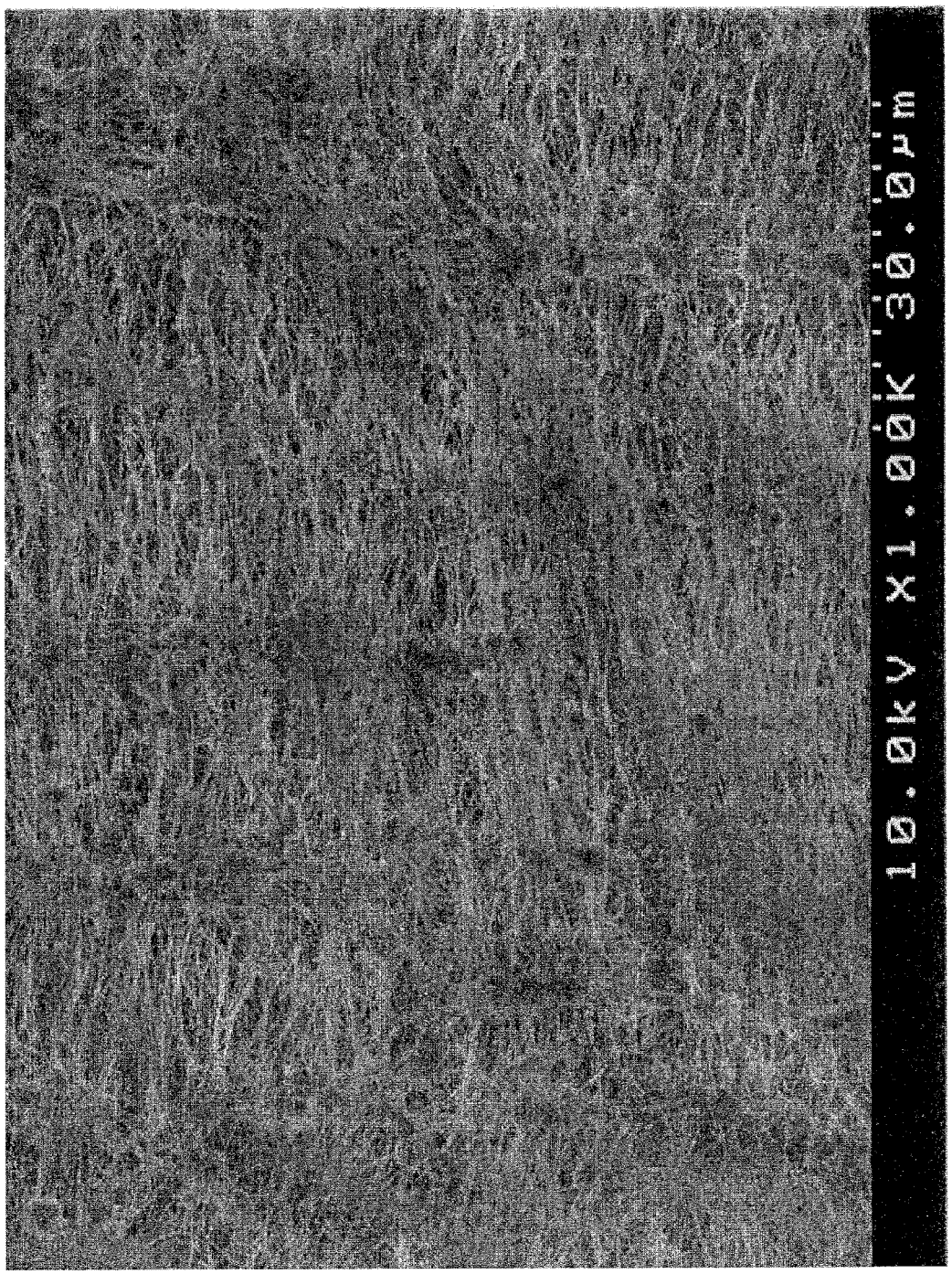
FIG. 15 is an SEM photograph of the outside of an un-matted ePTFE tube, as described in Example 1B.

An ePTFE tube may be made according the above described process. The ePTFE tube may be different from the prior art ePTFE tubes because of the matting step. One unique property of this matted ePTFE tube may be that it is made with a membrane having a coefficient of friction that is less than similarly made tubes not made according to the process of the instant invention. The coefficient of friction was measured by a method similar to that described above for the membrane. In one embodiment, the matted ePTFE membrane used in the ePTFE tube may have a coefficient of friction of less than 0.40. In another embodiment, the matted ePTFE membrane used in the ePTFE tube may have a coefficient of friction of less than 0.35. The reduced coefficient of friction may be due to the increased number of dense areas that are formed on the matted surface (FIG. 13) as compared to the unmatted tube surface (FIG. 15).

The ePTFE tube made according to the instant invention may also include other improved properties over a similar non matted ePTFE tube. These improved properties include: improved tensile strength in both the radial and axial directions (similar to TD and MD directions), reduced equivalent pore size as measured by the bubble point, and reduced permeability as measured by the gurley number. In one embodiment of the ePTFE tube made according to the instant invention, the tensile strength in the machine direction of the

TABLE 6

| | Effect of Matting & Sintering on Light Transmittance (%) | | | |
|---|---|---|---|---|
| Light Source Type | Initial ePTFE Membrane (unmatted and unsintered) | Sintered ePTFE Membrane (unmatted) | Matted ePTFE Membrane (unsintered) | Matted and Sintered ePTFE Membrane |
| Incandescent @ 182 Fc | 39 | 55 | 57 | 71 |
| Fluorescent @ 174 Fc | 37 | 36 | 59 | 65 |

When an extremely thin (0.2 mil thick) matted & sintered ePTFE membrane of Example 5 (also shown in FIG. 19) was tested as above, the transmittance was 91% (incandescent light) and 89% (fluorescent light). When this same 0.2 mil thick membrane was used as a light diffuser by stretching it over the housing of the 100 watt incandescent light source (Midmark Corp. Exam Lamp, Multilamp Model 1228-3) used in the transmittance test, the diffused light was very uniform, bright, and the glare from the bulb was dramatically reduced. Because the ePTFE membrane is porous it can also provide a venting function, and the high temperature 1 of the ePTFE membrane allows it to be placed closer than other lower melt plastics to the heated light bulb or filament sources matted ePTFE membrane making up the tube may be improved by at least 200% when compared to the MD tensile strength of a similar unmatted ePTFE membrane. In another embodiment of the ePTFE tube made according to the instant invention, the tensile strength in the transverse direction of the matted ePTFE membrane making up the tube used may be improved by at least 200% when compared to the TD tensile strength of a similar unmatted ePTFE membrane. In yet another embodiment of the ePTFE tube made according to the instant invention, the gurley number of the matted ePTFE membrane making up the tube may be increased by at least 150% when compared to the gurley number a similar unmatted ePTFE membrane. In yet another embodiment of the ePTFE tube made according to the instant invention, the bubble point of the matted ePTFE membrane making up the tube may be increased by at least 125% when compared to the bubble point of a similar unmatted ePTFE membrane.

The method of this invention, including matting by wetting immediately prior to sintering, may also improve the encapsulation of another material or article between wraps of ePTFE that form the inner and outer layers of a tube or multi-layered sheet. The encapsulated material may be metallic, a fluoropolymer, or carbon in the form of a wire, flat ribbon, a thin perforated mesh or a perforated tubular form such as a stent.

EXAMPLES

Example 1A

Figure 11:
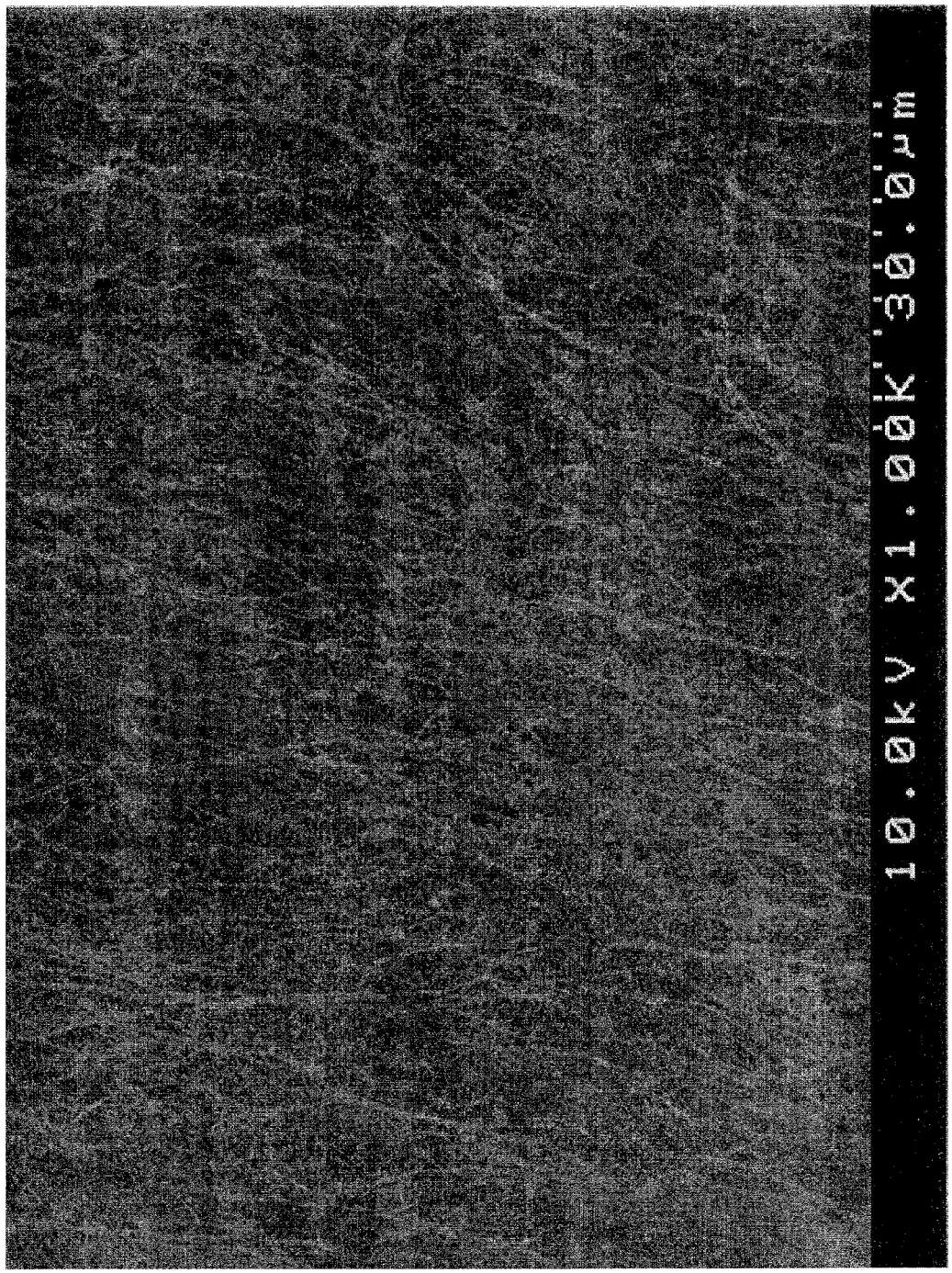
FIG. 11 is an SEM photograph of one embodiment of the instant invention of an unmatted ePTFE membrane used to make a matted tube, as described in Example 1A.

An ePTFE Tube was fabricated with IPA matting prior to sintering. A fine powder PTFE resin, type 601A, available from E.I. Dupont Company, was mixed with 90 gms/lb of Isopar H Lubricant. The resin was molded into a preform and extruded in a paste extruder to form a 7" wide×0.030" thick tape. The tape was calendered at 70° F. to a thickness of 0.020". The tape was next dried at 300° F. over heated rollers with approximately 10% tension applied, then the dried tape was stretched over the same heated rollers at a ratio of approximately 4:1. The stretched tape was then stretched again in the machine direction at 590° F. by another 10:1 ratio. The initial strength orientation of the extruded tape is approximately 2:1 (4698 gm MD/2344 gm TD) based on a tensile test of a ½" sample of tape cut from the end of an extrusion run. Based on the 2:1 strength ratio, an initial MD/TD fiber orientation of 2:1 is assumed. The total MD orientation from all steps of the process is: 2×1.5×1.1×4× 10=132:1. The tape was approximately 6" wide after MD orientation. The 6" wide MD oriented tape was fed through a tenter frame with a 4" clip spacing to a final width of 52" for a TD stretch of 13:1. Accounting for the 1" reduction in width from the initial extruded width of 7", the total overall TD orientation is approximately 6/7×13=11:1. The thickness of the final film exiting the tenter frame was approximately 0.1 mil. The film is highly oriented in the machine direction as depicted by the SEM photograph shown in FIG. 11. The direction and magnitude of the fiber orientation is seen to be in approximate agreement with the MD/TD orientation of 132/11 or 12:1. The MD/TD Strength ratio computed from break strength data is 7.9:1. The air flow through the membrane measured 4.0 seconds measured with a Gurley densometer at 300 cc. The bubble point after wetting the membrane with IPA is 20 psi.

The 0.1 mil membrane was next wrapped on a mandrel to form a 36 mm diameter tube. The tube was then matted by application of IPA soaked through the layers of ePTFE. The tube was placed in a convection oven to dry and sinter the matted ePTFE tube. The thickness of the resulting tube was approximately 2.5 mil. The Gurley flow through the tube wall averaged 39 seconds at 100 cc. The computed MD break strength was 8287 psi and the TD break strength was 2133 psi. The ratio of MD to TD break strength was 3.89:1. The coefficient of friction was measured by a method similar to that described by ASTM D1894-08 except that the specified number of samples was not tested, the sled material surface was not replaced each time a sample was processed, and an ePTFE thread was used instead of a nylon filament. The ePTFE membrane surface being measured was taped to a flat plane and was measured with respect to a nonwoven wipe available from E.I. Dupont (P/N 8801, Sontara Wiper, 55% Cellulose, 45% Polyester, thickness approximately 0.010"). The nonwoven wipe was attached to a 2.5"×2.5"×¼" thick sled that was weighted to 200 gms total weight. The sled was pulled by an ePTFE thread looped through a pulley and attached to a force gauge mounted on a Imada Universal Testing Machine with the speed set at 150 mm/min. The kinetic coefficient of friction was determined to be 0.3.

Figure 12:
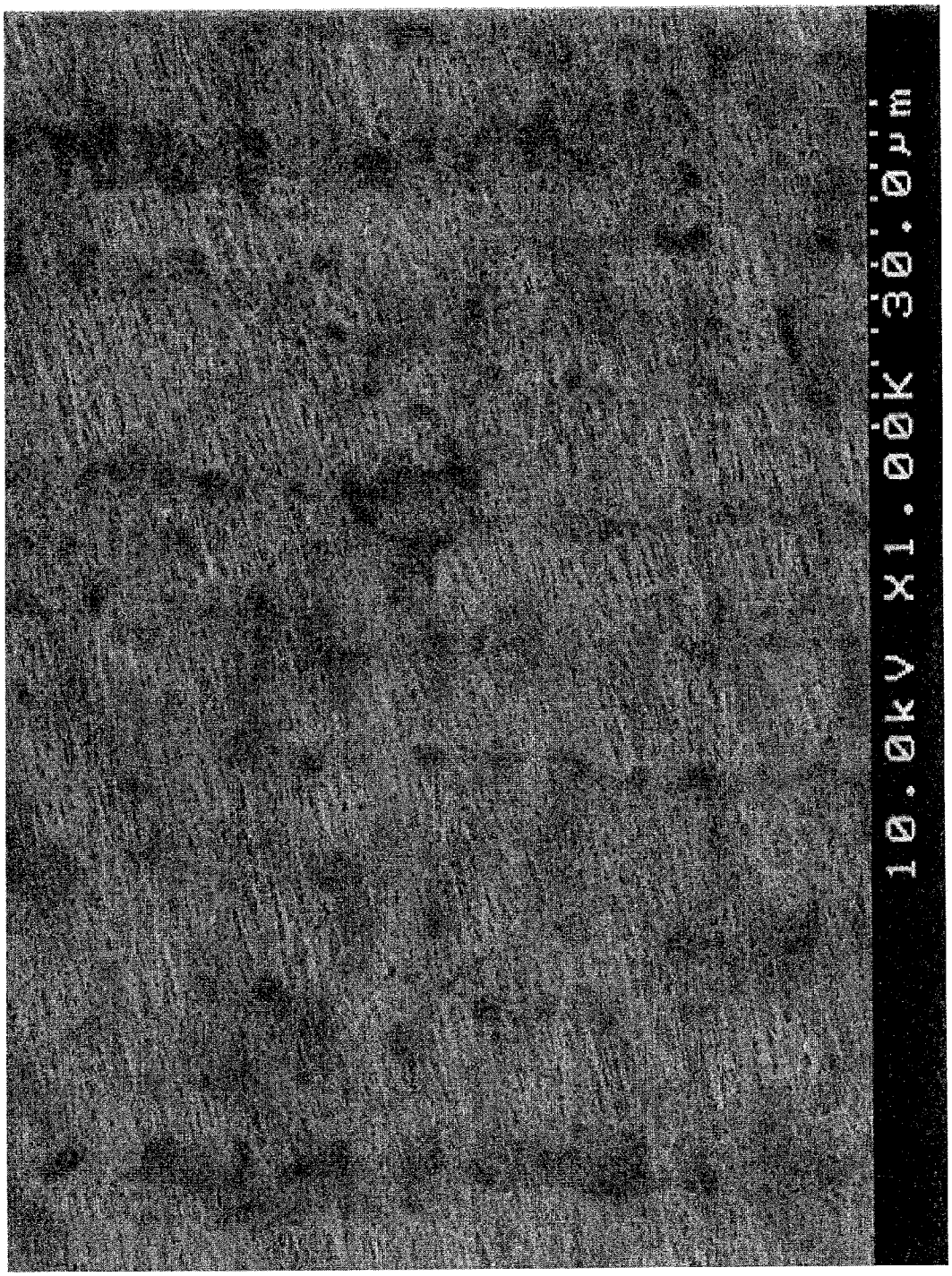
FIG. 12 is an SEM photograph of one embodiment of the instant invention of the inside of a matted ePTFE tube, as described in Example 1A.
Figure 13:
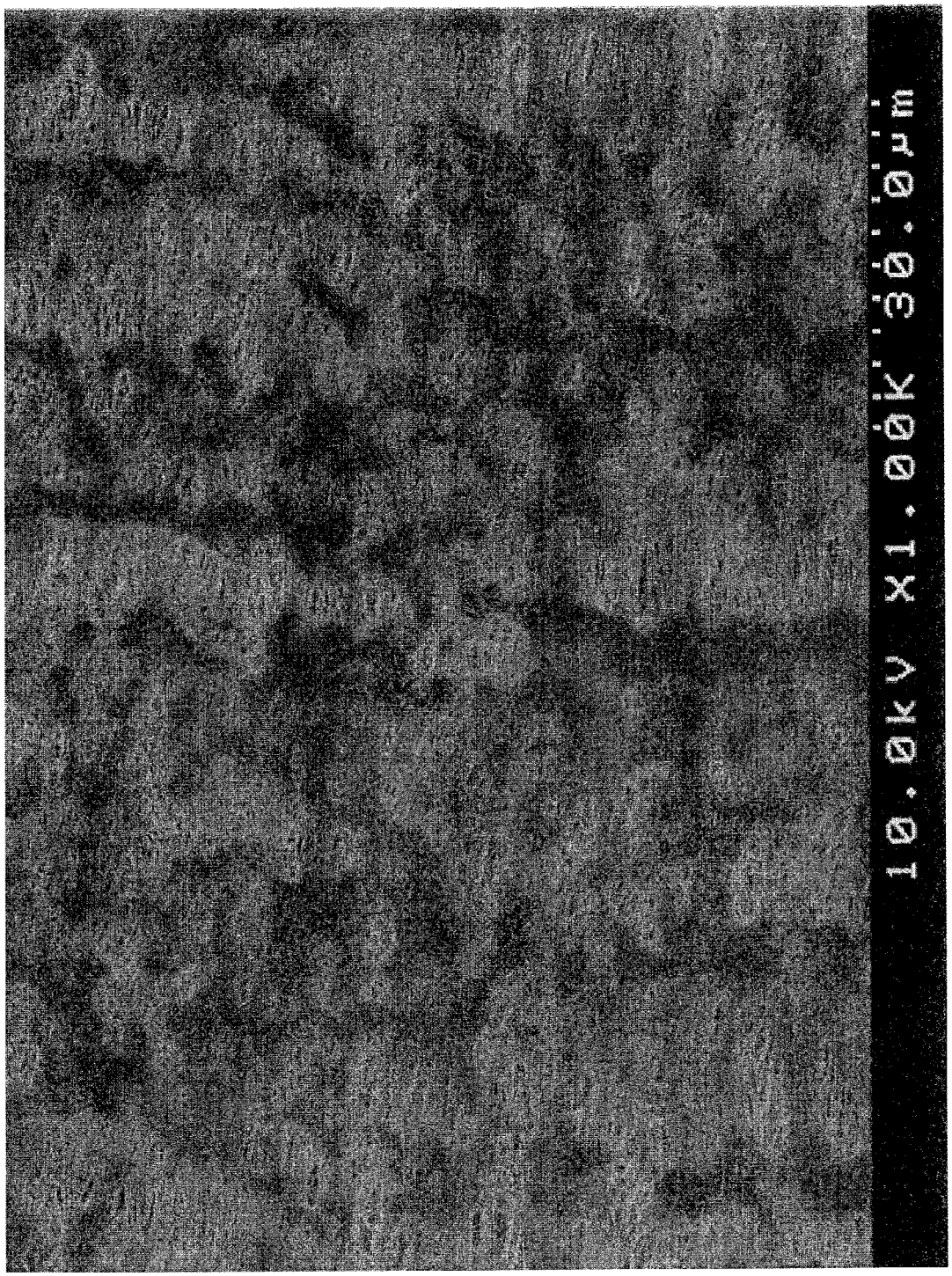
FIG. 13 is an SEM photograph of one embodiment of the instant invention of the outside of a matted ePTFE tube, as described in Example 1A.

The matted ePTFE tube inside & outside surfaces are shown by the SEM photos shown in FIGS. 12 and 13, respectively.

Example 1B

Same as example 1A except the tube was not matted with IPA prior to sintering. The Gurley flow of the tube averaged 29 seconds at 100 cc. The resulting wall thickness was approximately 4 mil. The coefficient of friction was 0.4. The computed MD break strength was 4441 psi and the TD break strength was 860 psi. The ratio of MD to TD break strength was 5.16:1. A comparison of Example 1A to 1B shows that the IPA matting treatment significantly reduces the membrane thickness (4 mil reduced to 2.5 mil), significantly reduces the coefficient of friction (0.4 reduced to 0.3), significantly increases the computed MD and TD strength, and makes the MD/TD strength much more uniform (5.16:1 reduced to 3.89:1).

Figure 14:
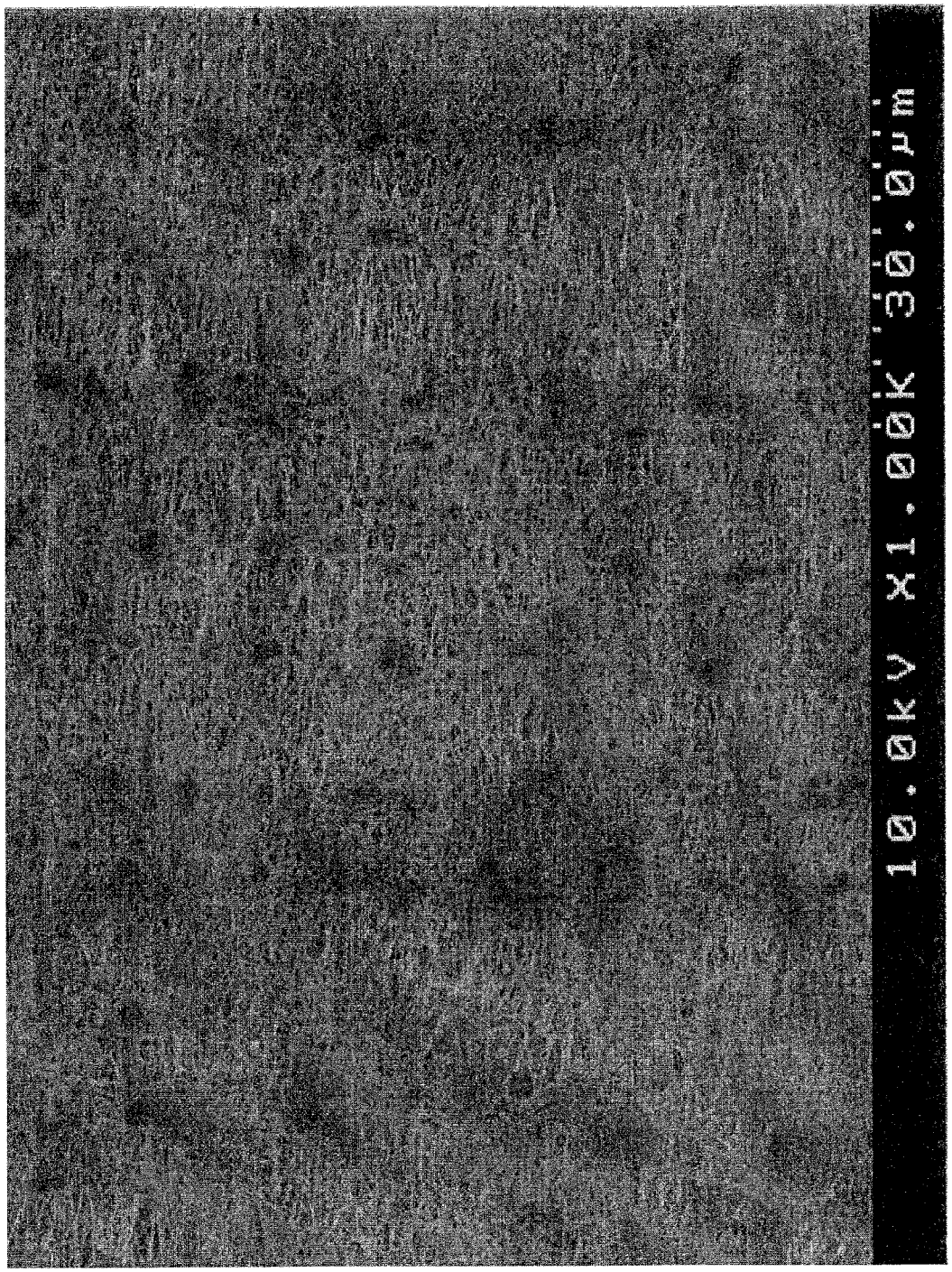
FIG. 14 is an SEM photograph of the inside of an un-matted ePTFE tube, as described in Example 1B.

The un-matted ePTFE tube inside & outside surfaces are shown by the SEM photos shown in FIGS. 14 and 15, respectively.

Example 2

An ePTFE Membrane was produced suitable for Use in Example 1A, except the resin used was F131, available from Daikin USA. The resulting ePTFE membrane was 0.1 mil thick, had a Gurley flow of 3.2 seconds@300 cc and a Bubble Point of 17 psi. The membrane is highly oriented in the machine direction, similar to the membrane shown in FIG. 11.

Example 3

Method of producing ePTFE membrane as described in Example 1A, except the resin used was DF132, available from Solvay Solexis. The resulting ePTFE membrane was 0.1 mil thick, had a Gurley flow of 3.7 seconds@300 cc and a Bubble Point of 14 psi. The membrane is highly oriented in the machine direction, similar to the membrane shown in FIG. 11.

Example 4

Method of producing ePTFE membrane as described in Example 1A, except the resin used was F107, available from Daikin USA. The resulting ePTFE membrane was was 0.1 mil thick, had a Gurley flow of 1.5 seconds@300 cc and a Bubble Point of 19 psi. The membrane is highly oriented in the machine direction, similar to the membrane shown in FIG. 11.

Example 5

Example of ePTFE Membrane that is matted with IPA. This example includes a method of producing ePTFE membrane as described in Example 1A, except the total MD orientation was approximately 16:1 and IPA was applied to the tentered membrane after the membrane was completely stretched in both the machine and transverse directions. The IPA was sprayed on the membrane by a spray nozzle having pressurized atomization air of 25 psi. The IPA was fed to the spray nozzle under pressure at 25 psi. The resulting spray pattern was uniform and similar to a fine spray pattern used for automotive body painting. The nozzle was reciprocated across the web using an electric linear actuator so that the spray pattern overlapped the previous pass during each stroke. The liquid pressure, air atomization pressure, nozzle mechanical adjustment and reciprocation length and speed were adjusted to apply the IPA so that it soaked into and matted the ePTFE membrane without excessive puddling on the surface. The tenter frame speed was adjusted to approximately 24-36 inches/minute which allowed adequate time to evaporate the IPA under IR heaters set to 400-600° F. and positioned approximately 18" from the spray nozzles. The IR heaters used to evaporate the IPA were set to 400-600 F and formed a zone of 4 ft in length. Another IR heater located further downstream was set to 900-1000 F and was used to sinter the matted membrane. The sintering temperature was adjusted to achieve sintering that was evidenced by a distinct darkening of the off white matted surface. Turning the IR heater temperature down resulted in a narrowing of the sinter. Increasing the IR heater temperature too much resulted in the membrane breaking or burning through. The visual indication of adequate sintering by examining the three off white color bands provided a simple means of determining whether or not the membrane was being sintered. Without the off white color bands it is more difficult to determine whether or not the membrane is adequately sintered.

Figure 16:
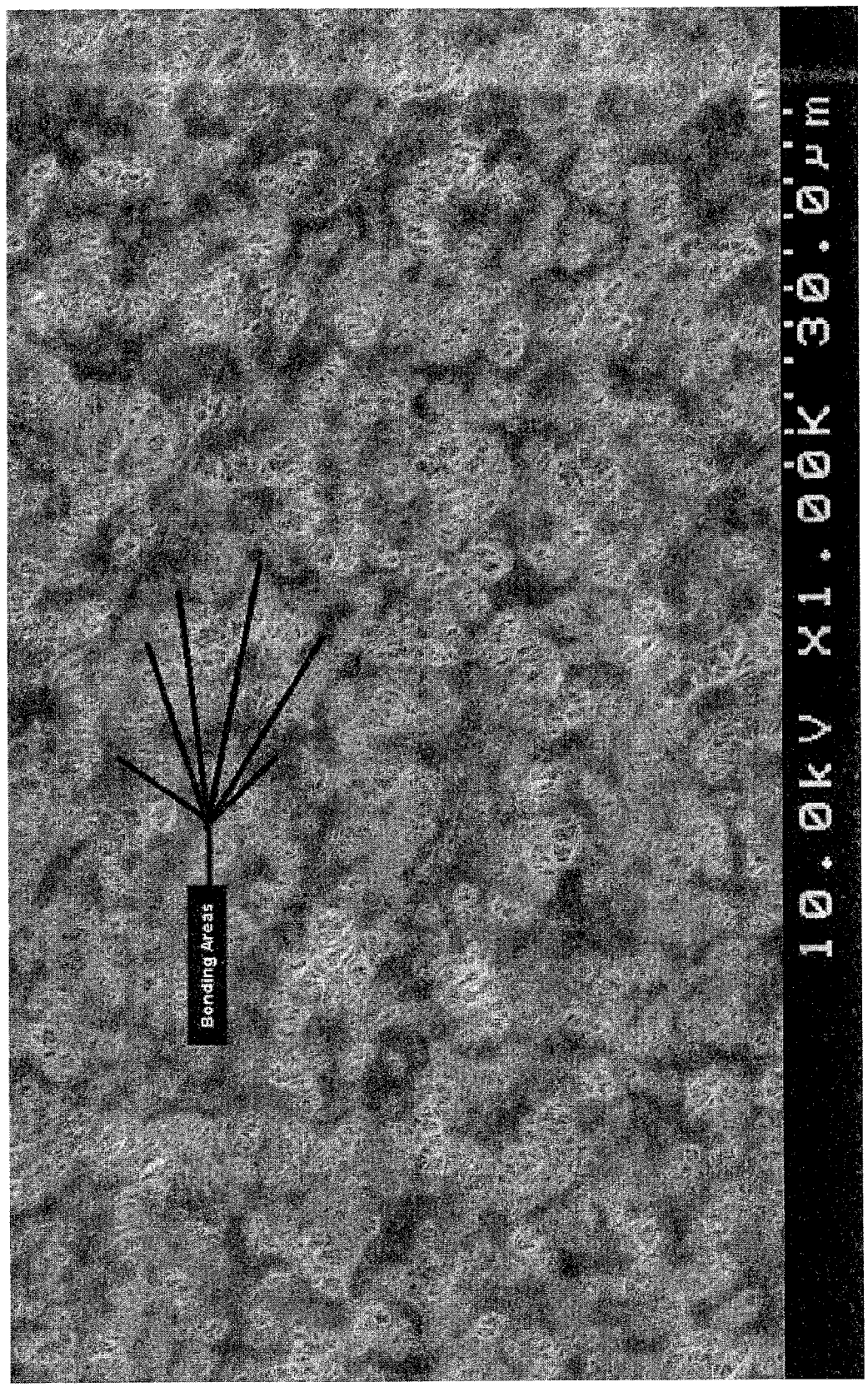
FIG. 16 is an SEM photograph of one embodiment of the instant invention of a matted ePTFE membrane, as described in Example 5.

FIG. 16 shows the SEM photograph of this ePTFE membrane that is matted with IPA. The SEM photograph shows the dark dense bonding areas which are fairly uniformly distributed and have smooth edges so as to provide a low coefficient of friction. The interconnected bonding areas also add strength to the membrane as compared to a membrane that is not matted that may have a matrix of separate bonding point. The improved bonding is verified with the increased peel strength of matted vs. unmatted membranes, as shown in Table 5 above.

Example 6

Figure 17:
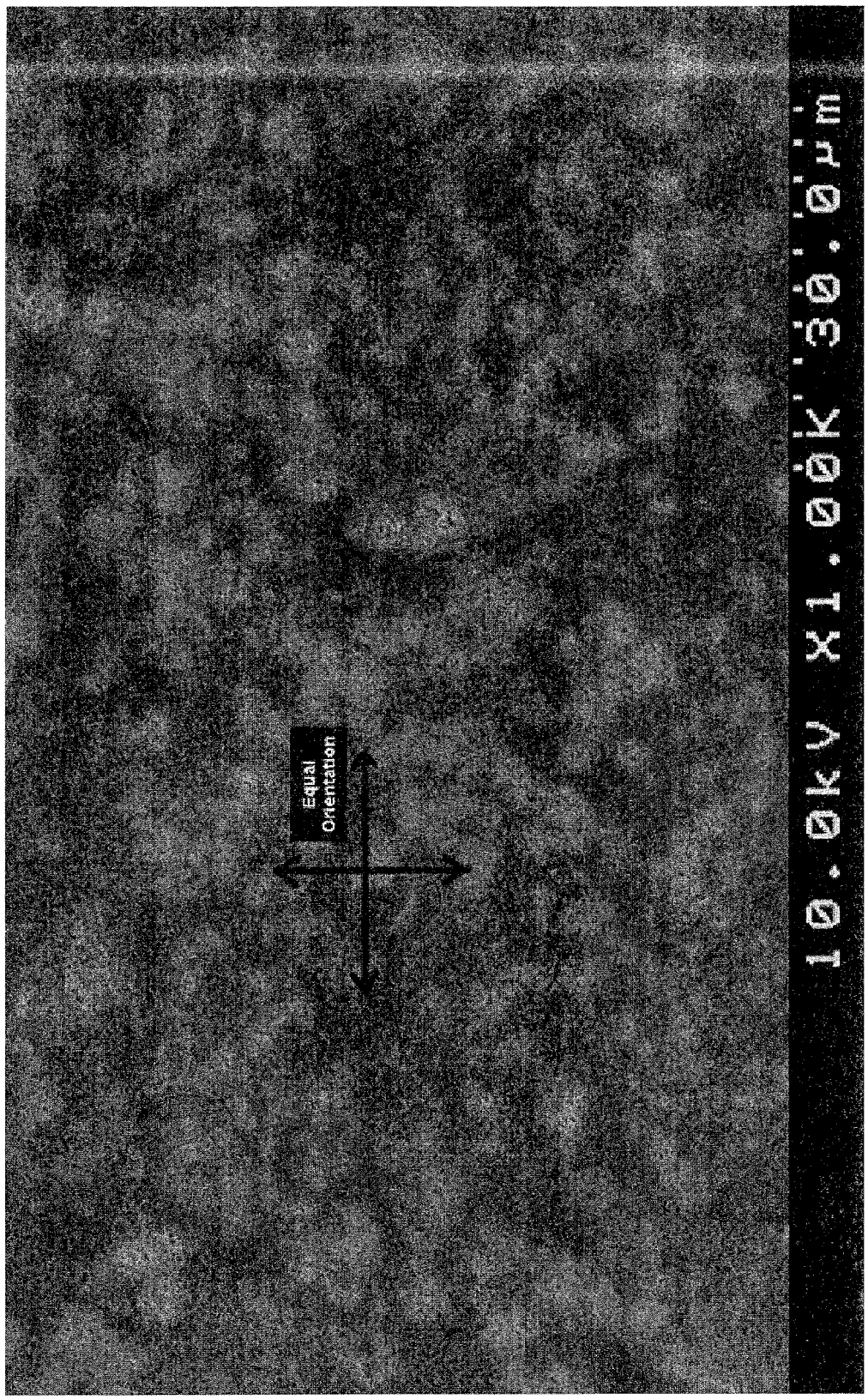
FIG. 17 is an SEM photograph of one embodiment of the instant invention of a drawn down and matted ePTFE tube, as described in Example 6.

Example of a method to make ePTFE Tubes that are radially expandable and have improved MD/TD (closer to 1:1) Strength Ratio. A 12 mm inner diameter×1.7 mil wall ePTFE tube was made using the method described in example 1A. As in example 1A the tube was matted with IPA prior to sintering. The strength of the resulting tube was greater in the radial as compared to the axial direction. Drawing the tube down also allows the tube to be later resized to much of its original diameter by means of a balloon catheter, by air or liquid pressure, or by a flat, round or symmetrical or profiled mandrel. The sintered 12 mm tube was drawn down by axially stretching over a sizing mandrel to form an 8 mm ID×1.25 mil tube. The axial stretch reoriented the ePTFE fiber structure, reducing the radial strength while increasing the axial strength. To test the radial expansion with respect to pressure one end of the formed 8 mm tube was tied into a knot. Then the other end was inserted onto a hose barb and air pressure was introduced through the barb. The center of the tube was held in the target zone of a laser micrometer unit. At 1 psi the tube's outside diameter measured 8.1 mm. At 35 psi the outside diameter increased to 10.0 mm. When the pressure was reduced to 1 psi the tube's outside diameter was reduced just 0.2 mm to 9.8 mm. An SEM photograph of this ePTFE tube that has been drawn down is shown in FIG. 17.

Figure 18:
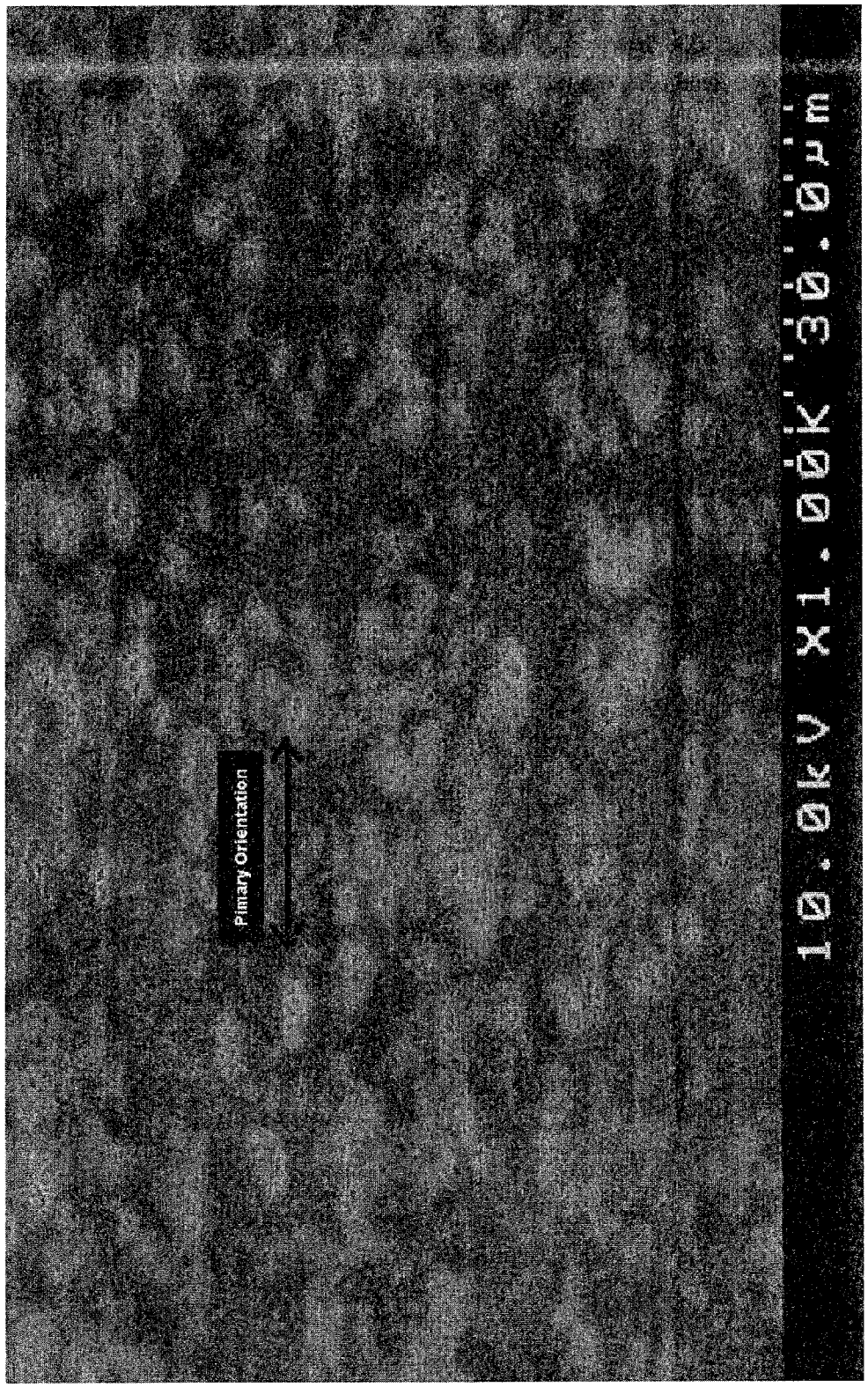
FIG. 18 is an SEM photograph of another embodiment of the instant invention of a matted ePTFE tube that is not drawn down, as described in Example 6.

For comparison, an ePTFE tube that has not been drawn down was tested in the same manner. A 12 mm ID×1.7 mil wall tube was connected to the hose barb and positioned in the target zone of a laser micrometer unit. At 1 psi the OD was 12.07 mm. At 30 psi the tube OD enlarged only by 0.08 mm at 30 psi. An SEM photograph of this ePTFE tube that has not been drawn down is shown in FIG. 18.

A careful examination of the before and after SEMs shows that the holes & fiber structure is more uniform when the ePTFE tube is drawn down where the diameter of the tube 12 mm ID tube down to 8 mm ID. FIG. 17 of the tube that was drawn down has holes & fibers that have a definite direction, whereas in FIG. 18, of the SEM of the ePTFE tube that was not drawn down, it is more difficult to determine a directional orientation. This may be due to the reduction of radial relative to the axial fiber orientation.

The present invention may be embodied in other forms without departing from the spirit and the essential attributes thereof, and, accordingly, reference should be made to the appended claims, rather than to the foregoing specification, as indicated in the scope of the invention.

We claim:

1. A method of making an ePTFE membrane including the steps of:
   providing an unsintered or partially sintered ePTFE membrane;
   matting said unsintered or partially sintered ePTFE membrane consisting of:
      wetting said unsintered or partially sintered ePTFE membrane with a wettable liquid; and
      drying said wetted ePTFE membrane with heat, thereby removing said wettable liquid and forming a matted ePTFE membrane; and immediately thereafter
   sintering said matted ePTFE membrane,
   wherein matting said unsintered or partially sintered membrane reduces the thickness of the unsintered or partially sintered membrane between 25-90%.

2. The method of making an ePTFE membrane according to claim 1 wherein matting said unsintered or partially sintered membrane reduces the thickness of said unsintered or partially sintered ePTFE membrane between 40-80%.

3. The method of making an ePTFE membrane according to claim 1 wherein matting said unsintered or partially sintered membrane reduces the thickness of said unsintered or partially sintered ePTFE membrane between 60% and 75%.

4. The method of making an ePTFE membrane of claim 1 where:
   said wettable liquid being selected from the group consisting of: an alcohol and a mineral solvent;
   said alcohol being a lower alkyl alcohol; and
   said mineral solvent being naptha.

5. The method of making an ePTFE membrane according to claim 1 where said step of wetting said unsintered or partially sintered ePTFE membrane with a wettable liquid includes the step of spraying said wettable liquid on top of said unsintered or partially sintered ePTFE membrane with a sprayer moving back and forth across said membrane.

6. The method of making an ePTFE membrane according to claim 1 where said step of drying said wetted ePTFE membrane includes heating said ePTFE membrane under a preheat heater;
   said preheat heater being set to a temperature of between 400° F. and 600° F.

7. The method of making an ePTFE membrane according to claim 6 where said preheat heater is set to a temperature of 550° F.

8. The method of making an ePTFE membrane according to claim 1 where said step of sintering said matted ePTFE membrane includes heating said membrane in a high temperature oven to a sintering temperature, said sintering temperature being between 600° F. and 1100° F.

9. The method of making an ePTFE membrane according to claim 8 where said sintering temperature is between 750° F. and 935° F.

10. The method of making an ePTFE membrane according to claim 1 where said step of sintering said matted ePTFE membrane includes the step of fine tuning sintering via visual detection;
   said step of fine tuning sintering via visual detection including adjusting said sintering temperature based on the opaqueness of said membrane.

11. The method of making an ePTFE membrane according to claim 1 where said step of providing an unsintered or partially sintered ePTFE membrane includes the steps of:
   mixing a fine powder polytetrafluoroethylene resin with a lubricant creating a mix;
   compressing said mix into a preform mold;
   extruding said molded mix into a tape;
   calendering said extruded tape;
   evaporating said lubricant from said extruded tape;
   stretching said calendered tape in the machine direction; and
   stretching said calendered tape in the transverse direction;
   thereby, forming an unsintered or partially sintered ePTFE membrane.

* * * * *